US010628285B1

(12) United States Patent
Kollu et al.

(10) Patent No.: US 10,628,285 B1
(45) Date of Patent: Apr. 21, 2020

(54) DYNAMIC CONFIGURATION OF AVAILABILITY OF DEBUGGING MESSAGES

(71) Applicant: American Megatrends International, LLC, Norcross, GA (US)

(72) Inventors: Naresh Kollu, Duluth, GA (US); Purandhar Nallagatla, Johns Creek, GA (US); Harikrishna Doppalapudi, Norcross, GA (US)

(73) Assignee: American Megatrends International, LLC, Norcross, GA (US)

( * ) Notice: Subject to any disclaimer, the term of this patent is extended or adjusted under 35 U.S.C. 154(b) by 37 days.

(21) Appl. No.: 16/040,130

(22) Filed: Jul. 19, 2018

(51) Int. Cl.
*G06F 11/36* (2006.01)
*G06F 9/4401* (2018.01)
*G06F 21/57* (2013.01)
*G06F 3/0484* (2013.01)

(52) U.S. Cl.
CPC .......... *G06F 11/362* (2013.01); *G06F 9/4401* (2013.01); *G06F 11/36* (2013.01); *G06F 11/3612* (2013.01); *G06F 11/3664* (2013.01); *G06F 21/575* (2013.01); *G06F 3/04842* (2013.01)

(58) Field of Classification Search
CPC .... G06F 11/362; G06F 11/36; G06F 11/3612; G06F 11/3664
See application file for complete search history.

(56) References Cited

U.S. PATENT DOCUMENTS

| 7,334,120 | B2 * | 2/2008 | Rothman | G06F 9/455 713/1 |
| 8,707,267 | B1 * | 4/2014 | Liu | G06F 11/3636 714/34 |
| 2005/0028146 | A1 * | 2/2005 | Quick | G06F 11/3688 717/130 |
| 2017/0024266 | A1 * | 1/2017 | Iwai | G06F 11/3656 |
| 2019/0065300 | A1 * | 2/2019 | Lo | G06F 11/0766 |

OTHER PUBLICATIONS

Kumar et al., "Using Model Checking to Debug Device Firmware" (Year: 2002).*

* cited by examiner

*Primary Examiner* — Phillip H Nguyen
(74) *Attorney, Agent, or Firm* — Newport IP, LLC

(57) ABSTRACT

Configuration of availability of debugging messages during the execution of a firmware in a debugging mode of operation is provided. The configuration can be updated without rebuilding the firmware. Thus, a selection of a group of available types of debugging messages can be updated dynamically, at various runtime instances of the firmware. The selection can be accomplished by configuring, at a runtime of the firmware, a level of recordation of debugging messages and one or more data structures associated with the level or recordation. Each of the one or more data structures includes elements indicative of respective types of debugging messages being enabled or disabled for presentation during the execution of the firmware in the debugging mode of operation. A debugging message can be provided based at least partially on at least one of the data structure(s) during the execution of the firmware in the debugging mode of operation.

26 Claims, 20 Drawing Sheets

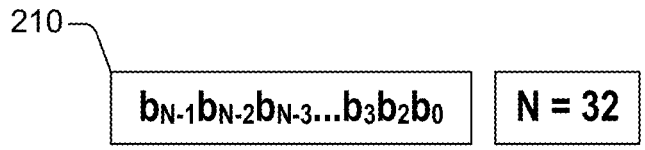

$b_0$: Initialization message
$b_1$: Warning message
$b_2$: Load Event message
$b_3$: File System message
$b_4$: Allocate or Free Pool message
$b_5$: Allocate or Free Page message
$b_6$: Information message
$b_7$: Dispatcher message
$b_8$: Variable message
$b_9$: Reserved
$b_{10}$: Boot Manager message
$b_{11}$: Reserved
$b_{12}$: BlockIO Driver message
$b_{13}$: Reserved
$b_{14}$: Network Driver message
$b_{15}$: Reserved
$b_{16}$: UNDI Driver message
$b_{17}$: LoadFile message
$b_{18}$: Reserved
$b_{19}$: Event message
$b_{20}$: Global Coherency Database Changes message
$b_{21}$: Memory Range Cachability Changes message
$b_{22}$: Detailed Debug message
$b_{23}$ - $b_{30}$: Reserved
$b_{31}$: Error message

FIG. 2

DYNAMIC CONFIGURATION OF AVAILABILITY OF DEBUGGING MESSAGES

BACKGROUND

A release version is the typical version of a firmware that is executed within a computing system deployed for operation in a computing platform such as a server farm, a data center, cloud computing environments, and the like. Debugging information is generally unavailable during the execution of the released version of firmware. Thus, it can be difficult to identify a root cause of functional issues that arise during the execution of the release version of firmware.

The functional issues can thus prompt an end-user or a developer to rebuild the firmware for execution in a debugging mode of operation in an attempt to re-create the functional issues and identify a root cause of one or more of the issues. Firmware operating in a debugging mode of operation (debugging mode) can provide debugging messages indicating aspects of its operation. Yet, rebuilding the firmware may impermissible or plain unfeasible.

Further, the functional issues that caused the firmware to be rebuilt may be difficult to reproduce because conditions of the computing system or a component thereof may change upon or after the firmware is rebuilt and contents of a non-volatile memory device that contains the firmware are updated. For instance, functional issues observed after multiple reboots, due to changes in management engine (ME) settings or non-volatile memory device settings, may not be easily reproducible when a new image for the firmware is updated in the non-volatile memory. Indeed, in some instances it is very difficult to re-create functional issues by rebuilding the firmware because the issues may arise from hardware instability after multiple reboots.

Therefore, even in instances in which faulty firmware can be rebuilt for execution in debugging mode, prior functional issues may be absent after the firmware is rebuilt—e.g., issues observed under operation with a particular image of a release version of the firmware may be irreproducible after the image is updated within the non-volatile memory device.

Still in instances in which observed or otherwise reported functional issues can be straightforwardly reproduced, the issues can pertain to a particular domain or a particular module of a computing device that includes the firmware. Domains can include, for example, peripheral component interconnect (PCI), central processing unit (CPU), memory, platform code, and so forth. Modules can include, for example, a PCI bus module; an intelligent platform management interface (IPMI) module; nonvolatile memory express (NVMe) module; universal serial bus (USB) module; or the like. Accordingly, without a priori knowledge of a likely domain and/or module that causes the functional issues, debugging the functional issues may be difficult or plainly unfeasible despite having access to debugging information.

Therefore, much remains to be improved in conventional technologies to select types of debugging messages that can be available for recordation during execution of a firmware in a debugging mode of operation.

SUMMARY

The disclosure recognizes and addresses, in at least some embodiments, the issue of configuration of availability of debugging messages during the execution of a firmware in a debugging mode of operation. The firmware can be part of a computing system having a defined architecture. The computing system can be embodied in or can include an embedded system, a wireless system, a cloud computing system, a data center system, a combination of the foregoing, or the like.

In particular, yet not exclusively, the disclosure provides computing systems, computing devices, computer-implemented techniques, and computing program products for dynamic configuration of availability of one or more types of debugging messages during the execution of a group of firmware components of the firmware in a debugging mode of operation. Such a configuration can be implemented at runtime of the firmware, rather than during build-time of the firmware. Thus, a selection of the type(s) of debugging messages can be updated at different times without rebuilding the firmware.

In some embodiments, a computing device that executes the firmware can configure a mask (such as a bitmask) to select a group of types of debugging messages to be available during execution of the firmware in the debugging mode of operation. The mask can include, in some embodiments, data elements indicative of the availability of respective types of debugging messages. Specifically, each one of the data elements can indicate that a type of debugging message is either enabled for recordation or disabled for recordation. For instance, the data elements can be embodied in a string of bits, where each one of the bits indicates either a recordation enabled state or a recordation disabled state for a defined type of debugging message. The mask can be associated with a module or another type of component of the firmware. In one example, the association can be represented or otherwise indicated by a logical pairing of the mask and a globally unique identifier (GUID) of the module.

A selection of a group of types of debugging messages can have a defined scope within the execution of the firmware in the debugging mode of operation. The scope can be characterized by a number of modules or other components of the firmware to which the selection applies. More specifically, in some instances, the scope can correspond to the entirety of the execution of the firmware, where such the selection applies to each module (or, in some embodiments, each component) of the firmware that is executed. Therefore, a one-to-many association can be configured between a mask (or another type of data structure) indicative or otherwise representative of the selection and the modules that fully constitute the firmware.

In other instances, the scope can correspond to a portion of the execution of the firmware, where such a portion includes multiple modules (or other types of components) and the selection applies to each one of the multiple modules. Accordingly, a one-to-many association can be configured between a mask (or another type of data structure) indicative or otherwise representative of the selection and the multiple modules. Different portions of the execution of the firmware can have respective masks or other types of respective data structures. Therefore, in sharp contrast with conventional debugging technologies, not only can such a selection be implemented at a runtime of the firmware, but the selection can determine a specific domain of modules for which specific type(s) of debugging messages are available for recordation, without rebuilding the firmware each time a selection is made. The specific domain of modules can be embodied in or can include, for example, PCI, CPU, memory, platform code, and so forth.

Further, in some embodiments, the firmware complies with the Unified Extensible Firmware Interface (UEFI) Specification. The UEFI Specification describes an interface between an operating system (OS) and a UEFI Specification-compliant firmware. The UEFI Specification also defines a way for the OS and the UEFI Specification-compliant firmware to exchange information necessary in order to support the OS boot-up process. The terminology "UEFI Specification" as is utilized herein refers to both the EFI Specification developed by INTEL CORPORATION and the UEFI Specification managed by the UEFI FORUM. Therefore, a portion of the execution of the firmware can correspond to a phase of execution of the firmware, such as a security (SEC) phase, a pre-EFI (PEI) phase, a driver execution environment (DXE) phase, or boot device selection (BDS) phase.

In yet other instances, the scope can correspond to the execution of an individual module of the firmware, where the selection of the group of types of debugging messages applies to the individual module. Thus, multiple one-to-one associations can be configured between modules of the firmware and respective masks indicative or otherwise representative of respective selections of type(s) of debugging messages for recordation. Specifically, a first one-to-one association can be configured between a first module and a first mask, a second one-to-one association can be configured between a second module and a second mask, and so forth. In sharp contrast with conventional debugging technologies, not only can such selection be implemented at a runtime of the firmware, but the selection can determine a specific module for which one or more specific types of debugging messages are available without rebuilding the firmware each time a selection is made. The specific module can be embodied in or can include, for example, a PCI bus module; an IPMI module; an NVMe module; a USB module; or the like.

The configuration of masks and the configuration of associations of the masks with respective modules can permit precise control of the types of debugging messages that are available at a runtime of the firmware. The control can be achieved by, for example, activating one or more types of debugging messages for a corresponding module of the firmware, without a requirement to rebuild the firmware upon or after the configuration of masks and/or such associations. Accordingly, in juxtaposition with conventional debugging technologies, embodiments of this disclosure permit readily adjusting—without rebuilding the firmware—the debugging information that is available during the execution of the firmware in the debugging mode of operation. Therefore, a priori knowledge of a specific firmware domain of debugging is not required nor is it required to rebuild the firmware in order to assess whether the specific domain is the root cause of operation issues with the firmware.

In some embodiments, a table that relates one or more masks associated with respective modules of a firmware can represent settings that permit or otherwise facilitate customized recordation of debugging message during execution of the firmware in a debugging mode of operation. Default settings for recordation of debugging messages in accordance with this disclosure can be configured at build-time for the firmware. Extant settings (either default settings or current settings) can be updated at a runtime of the firmware by updating at least one of the mask(s) in the table.

To that end, a debugging configuration service can be provided in order to update the table at a runtime of the firmware. The table can be updated to include the mask(s). The debugging configuration service can make available one or more first application programming interfaces (APIs) or another type of interface. The debugging configuration service also makes available one or more second APIs to access the settings for recordation of debugging messages, upon or after the settings are configured.

The debugging configuration service can include, in some embodiments, individual configuration services corresponding to respective portions of the firmware. For instance, in embodiments in which the firmware complies with the UEFI Specification, the debugging configuration service can include a PEI-module (PEIM)-to-PEIM interface (PPI) service and a protocol service that correspond, respectively, to a PEI phase and a DXE phase of the firmware. In UEFI, PEIMs are specialized drivers that customize the PEI Foundation to a computing platform. PEIMS are analogous to DXE drivers and generally correspond to the components being initialized. A PEI phase of the firmware generally provides mechanisms for PEIMs to locate and invoke interfaces from other PEIMs, thus various PPIs can be available in the firmware.

Further, one or more first user interfaces (UIs) can be presented in order to receive first information that defines a scope of the selection of a group of types of debugging messages. In addition, one or more second user interfaces (UIs) also can be presented in order to receive second information that defines one or more masks associated modules (or other types of components) of a firmware. The first UI(s) and/or the second UI(s) can be presented at a display device integrated in or functionally coupled to a computing system that includes the firmware.

A message output module can provide a debugging message to a debugging output device based at least on extant settings. Specifically, in response to execution of a module of a firmware in the debugging mode of operation, the message output module can access extant settings and can identify a mask and a module associated with the mask. Using at least the mask, the message output module can identify one or more types of debugging messages that are enable for presentation during the execution of the module in the debugging mode of operation. The message output module can send a group of debugging messages to a debugging output device, where the group of debugging messages corresponds to the one or more types.

While embodiments of the disclosure are illustrated in connection with masks and modules, this disclosure is not limited to masks nor is it limited to firmware modules. Other types of data structures instead of masks can be defined for same or similar purposes. In addition, rather than being associated with modules, masks can be associated with other components of a firmware. Other types of firmware components besides, or in addition to, firmware modules can be contemplated. Specifically, the principles of this disclosure apply to any individually executable component that constitutes the firmware is uniquely identifiable.

Further, the disclosure is not limited to firmware and associated firmware components. The principles disclosed herein for dynamic configuration of the availability of defined types of debugging messages can be applied to other types of software projects. For instances, software architectures that have an underlying modular arrangement can utilized or otherwise leverage aspects of this disclosure.

Embodiments of the disclosure provide several technical benefits. For example, by dynamically configuring, at a runtime of a firmware, a scope and/or granularity of recordation of debugging messages, root cause analysis of issues present in the firmware can be identified without causing changes to the contents of a non-volatile memory that retains the firmware. Therefore, potential issues encountered while operating the firmware in the field can be monitored and, potentially, resolved while in the field and without rebuilding the firmware. As another example, in contrast to technologies that rely on static configuration of debugging messages during the building of a firmware, the dynamic configuration described herein can be implemented from any media (non-transitory or otherwise) without exclusive reliance on changes to the contents of non-volatile memory device that retains the firmware. As such, greater flexibility to control the debugging process during runtime can be realized.

At least the foregoing technical benefits can provide superior flexibility and/or efficiency relative to conventional technologies to configure the types of debugging messages that are available for recordation during the execution of a firmware. These and other technical benefits also can be realized through an implementation of the technologies disclosed herein.

This Summary is provided to introduce a selection of the technologies disclosed herein in a simplified form that are described in greater detail below in the Detailed Description. This Summary is not intended to identify key elements or essential elements of the claimed subject matter, nor is it intended that this Summary be used to limit the scope of the claimed subject matter. Furthermore, the claimed subject matter is not limited to embodiments or implementations thereof that solve any or all disadvantages noted in any part of this disclosure.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows:

FIG. 2 illustrates an example of a data structure for dynamic configuration of availability of debugging messages during execution of a firmware in a debugging mode of operation, in accordance with one or more embodiments of the disclosure.

DETAILED DESCRIPTION

Figure 1:
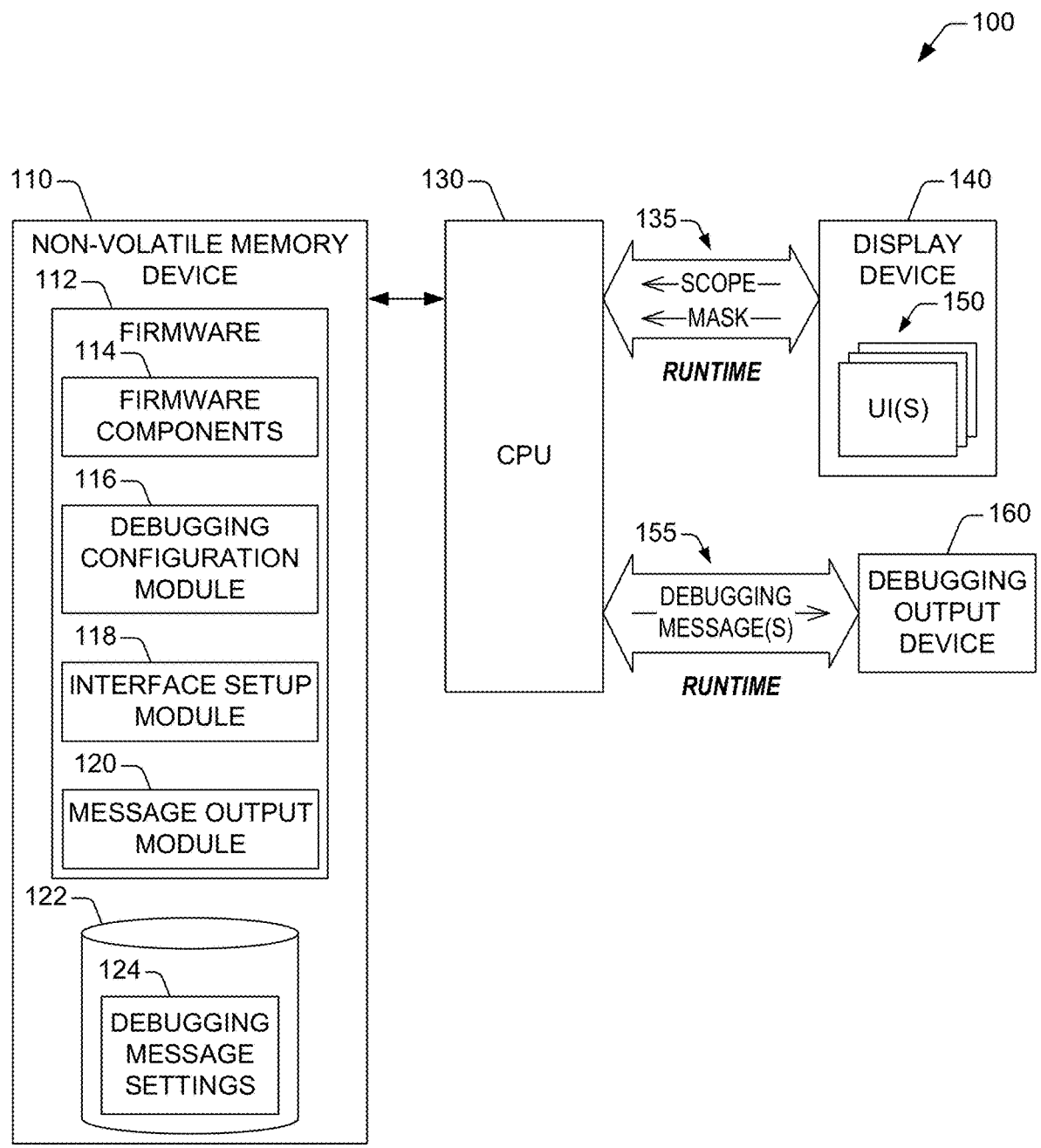
FIG. 1 illustrates an example of a computing architecture for dynamic configuration of availability of debugging messages during execution of a firmware in a debugging mode of operation, in accordance with one or more embodiments of the disclosure.

As mentioned, the disclosure recognizes and addresses, in at least some embodiments, the issue of configuration of availability of debugging messages during the execution of a firmware in a debugging mode of operation. More specifically, the disclosure permits or otherwise facilitates configuration of the availability of one or more types of respective debugging messages during the execution of the firmware in the debugging mode of operation. The configuration can be implemented at a runtime of the firmware, after the firmware has been built and deployed. Thus, a selection of the type(s) of respective debugging messages can be updated at different times without rebuilding the firmware.

As is described in greater detail below, embodiments of the disclosure can permit or otherwise facilitate updating a selection of types of debugging messages dynamically, at various runtime instances of a firmware. The selection can be accomplished by configuring, at a runtime of the firmware, a level of recordation of debugging messages and one or more data structures associated with the level or recordation. The level of recordation of debugging messages can determine the extent of the execution of the firmware in a debugging mode of operation that yields debugging messages. Each of the one or more data structures includes elements indicative of respective types of debugging messages being enabled or disabled for presentation during the execution of the firmware in the debugging mode of operation. A debugging message can be sent to a debugging output device based at least on the data structure(s), during the execution of the firmware in the debugging mode of operation.

The subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, it is noted that other implementations can be performed in combination with other types of program modules. Generally, program modules include routines, programs, components, data structures, and other types of structures that perform particular tasks or implement particular abstract data types.

Aspects and/or elements of the subject matter described herein can be practiced on or in conjunction with other computer system configurations beyond those disclosed herein, including multiprocessor systems, microprocessor-based or programmable consumer electronics, minicomputers, mainframe computers, handheld computers, personal digital assistants, e-readers, mobile telephone devices, tablet computing devices, wearable devices, special-purpose hardware devices, network appliances, and the like.

The architectures and techniques disclosed herein can be practiced, in some embodiments, in distributed computing environments where tasks can be performed by remote computing devices that are linked or otherwise communicative coupled via a communication network. In a distributed computing environment, program modules can be located in both local memory storage devices and remote memory storage devices.

With reference to the drawings, FIG. 1 illustrates an example of a computing architecture 100 for dynamic configuration of availability of debugging messages during execution of a firmware in a debugging mode of operation, in accordance with one or more embodiments of the disclosure. The exemplified computing architecture 100 includes a non-volatile memory device 110 having encoded thereon firmware 112. The non-volatile memory device 110 can be embodied in or can include a flash memory device, for example.

The firmware 112 includes firmware components 114. Each one (or, in some embodiments, at least one) of the firmware components 114 is uniquely identifiable within the scope of a software system that includes the firmware 112. In addition, each one (or, in some embodiments, at least one) of the firmware components 114 can be embodied in or can include a defined group of machine-accessible instructions (e.g., computer-readable instructions and/or computer-executable instructions) and/or machine-readable data configured to be executed by one or more processors in order to cause the processor(s) to provide firmware functionality. In one embodiment, the one or more processors can constitute respective central processing units (CPUs). In other embodiments multiple processors can constitute a single CPU.

In some embodiments, the firmware 112 can be implemented to be compliant with the UEFI Specification. Thus, the firmware components 114 comply with the UEFI Specification. For instance, the firmware components 114 can be embodied in or can include firmware modules. The firmware modules can include one or more firmware file system (FFS) files, such as one or more extensible firmware interface (EFI) drivers and/or one or more EFI applications. The firmware components 114 can be configured or otherwise arranged in one or more firmware volumes (FVs; not depicted).

As mentioned, other types of firmware can be utilized in other embodiments of the disclosure. More specifically, the principles of this disclosure can apply to any partitioning of non-volatile firmware storage that encapsulates individually executable components, each being uniquely identifiable. Additional details regarding the configuration and operation of the firmware 112 in one embodiment are provided herein with respect to FIG. 19.

As is illustrated in FIG. 1, the firmware 112 also can include a debugging configuration module 116 that can permit or otherwise facilitate the configuration of availability of one or more types of respective debugging messages during the execution of a group of the firmware components 114 in a debugging mode of operation. The debugging configuration module 116 can include, in some embodiments, other configuration modules corresponding to respective portions of the firmware 112. For instance, in an embodiment in which the firmware 112 complies with the UEFI Specification, the debugging configuration module 116 can include a PEI configuration module and a DXE configuration module (neither depicted in FIG. 1) that correspond, respectively, to a PEI phase and a DXE phase of the firmware 112. More generally, the other configuration modules can include a first configuration module and a second configuration module that correspond, respective, to a hand-off block (HOB)-producer phase and a HOB-consumer phase of the firmware 112.

The debugging configuration module 116 can permit or otherwise facilitate implementing such a configuration at a runtime of the firmware 112. Thus, in contrast to conventional debugging technologies, the debugging configuration module 116 permits or otherwise facilitates implementing a selection of the one or more types of respective debugging messages at a runtime of the firmware 112. The selection can be dynamic in that the selection can be updated at defined times during the debugging of the firmware 112, without rebuilding the firmware 112.

To that end, the exemplified computing architecture 100 includes a central processing unit (CPU) 130 that can execute the firmware 112. The CPU 130 is functionally coupled to the non-volatile memory device 110 and can include one or more processors, each having at least one processing core. The one or more processors can be assembled in one or more computing chipsets.

More specifically, the CPU 130 can execute the debugging configuration module 116 to configure, at a runtime of the firmware 112, a level of recordation of debugging messages during the execution of the firmware 112 in a debugging mode of operation. The level of recordation can determine a scope of execution of the firmware 112 that can yield at least one debugging message in response to execution of the firmware 112 in the debugging mode of operation. Thus, the level of recordation corresponds to a selection of a group of the firmware components 114 that can yield one or more debugging messages in response to execution in the debugging mode of operation.

The selected group of the firmware components 114 can span a defined portion of the firmware 112. In some scenarios, the scope of execution of the firmware 112 corresponds to the entirety of the execution of the firmware 112. Therefore, the group of the firmware components 114 spans the entirety of the firmware components 114 that constitute the firmware 112. The level of recordation of debugging messages that can be achieved within such a scope can be referred to as "global level," for example.

In other scenarios, the scope of execution of the firmware 112 in the debugging mode of operation corresponds, for example, to the execution of the entirety of firmware components included in a boot-up phase of the firmware 112. As such, the group of firmware components 114 associated with the level of recordation spans the entirety of the firmware components in the boot-up phase. As mentioned, in some embodiments, the firmware 112 complies with the UEFI Specification, and the entirety of the firmware components included in the boot-up phase of the firmware 112 can include at least one firmware component of a SEC phase; at least one firmware component of a PEI phase; at least one firmware component of a DXE phase; or at least one firmware component of a BDS phase. More generally, the group of firmware components 114 associated with the level of recordation can include a first entirety of first firmware components included in a HOB-producer phase of the firmware 112, or a second entirety of second firmware components included in a HOB-consumer phase of the firmware 112. The level of recordation of debugging messages that can be achieved within such a scope can be referred to as "phase level," for example.

In yet other scenarios, the scope of execution of the firmware 112 in the debugging mode of operation corresponds to the execution of an individual component of the firmware components 114. Examples of the individual module of the firmware include a PCI bus module, an IPMI module, an NVMe module, a USB module, one of the modules depicted in elements 1212 in FIG. 12, one of the modules depicted in elements 1312 in FIG. 13, one of the modules depicted in elements 1512 in FIG. 15, and one of the modules depicted in elements 1612 in FIG. 16. The level of recordation of debugging messages that can be achieved within such a scope can be referred to as "module level," for example.

Therefore, by configuring the level of recordation, the amount of available debugging information can be adjusted to a desired or otherwise intended amount, thus reducing extraneous debugging information. Accordingly, compared to conventional technologies, improved debugging efficiency can be attained because reliance on communication of debugging messages to a serial debugging output device can be reduced. Thus, typically slow transmission of information to a serial device can be contained or otherwise avoided in embodiments of this disclosure.

The CPU 130 also can execute the debugging configuration module 116 to configure, at a runtime of the firmware 112, at least one data structure (e.g., at least one mask) associated with the level of recordation of debugging messages during the execution of the firmware 112 in a debugging mode of operation. The at least one data structure can include, in some embodiments, respective groups of elements indicative or otherwise representative of the availability of types of debugging messages. Each one of the elements of such a group of elements can indicate, for example, that a type of debugging message is either enabled for recordation or disabled for recordation during execution of the firmware 112 in the debugging mode of operation.

More specifically, in one embodiment, the at least one data structure can include at least one respective group of bits, where each bit in the group of bits indicates one of a recordation enabled state or a recordation disabled state for a defined type of debugging message. For instance, the group of bits can be embodied in a string of N bits $b_{N-1} b_{N-2} \ldots b_2 b_1 b_0$. Here, N can be a natural number and $b_k$, represents a bit value of 1 or 0, with $k=0, 2 \ldots N-1$. As is illustrated in FIG. 2, in one embodiment, N can be equal to 32 and at least some of the bits can correspond to a defined type of debugging message. As is further illustrated in FIG. 2, one or more of the bits can have a "reserved" type. Such bits may correspond to a defined type of debugging message and can be used for specific customized types in a prospective build of a firmware. For $k=0, 2 \ldots N-1$, $b_k=0$ can indicate that recordation of the defined type of debugging message is disabled and $b_k=1$ can indicate that recordation of the defined type of debugging message is enabled. The types of debugging messages and the particular arrangement of such messages—e.g., the particular correspondence between $b_k$ and type of message—that are shown in FIG. 2 are merely illustrative, and other types and arrangements can be implemented, including other arrangements for reserved messages.

With further reference to FIG. 1, as part of the configuration of at least one data structure associated with the level of recordation of debugging messages during the execution of the firmware 112 in a debugging mode of operation, the CPU 130 can execute the debugging configuration module 116 in order to retain the at least one data structure in the non-volatile memory device 110. The at least one data structure (e.g., one or more masks) can be retained in one or more memory elements 122, within one or more data structures 124. The data structure(s) 124 can be collectively referred to as debugging message settings 124.

In some embodiments, the debugging message settings 124 can be embodied in or can include a platform configuration database (PCD) of a defined type. In deep contrast to conventional debugging technologies, an entry (or an element) of such a PCD can be updated at a runtime of the firmware 112 rather than at build-time of the firmware 112 (during the time that firmware 112 or a boot-loader associated therewith is built). Consistent with UEFI compliant codebase, in one of such embodiments, the firmware 112 can include interfaces for abstracting certain types of PCDs.

As disclosed herein, a data structure associated with a level of recordation of debugging messages during the execution of the firmware 112 in a debugging mode of operation can indicate or otherwise represent a selection of one or more types of respective debugging messages to be available during the execution of the firmware 112 in the debugging mode of operation. At least in view of the association of the data structure with such level of recordation, the data structure (e.g., a bitmask) is associated with one or more components of the firmware components 114. The association can be represented or otherwise indicated, for example, by a mapping between the data structure and one or more globally unique identifiers (GUIDs) of respective firmware components.

The mapping can be retained in the debugging message settings 124, in a table that relates the data structure to the GUIDs, for example. The mapping can correspond to a default mapping generated at build-time of the firmware 112 or a current mapping generated at a runtime of the firmware 112, in accordance with aspects of this disclosure.

More specifically, during build-time, the debugging configuration module 116 can generate a default table that associates GUIDs of modules (or other types of components) of the firmware 112 with respective default bitmasks. In accordance with this disclosure, the default bitmasks are indicative of respective default selections of types of debugging messages available for presentation during the execution of the firmware 112 in a debugging mode of operation.

As mentioned, in some embodiments, the debugging configuration module 116 can include multiple configuration modules that correspond to respective portions of the firmware 112. During build-time, each one of the multiple configuration modules can generate a default table that associates a defined group of modules of the firmware 112 and defined default masks. In some implementations, a first one of the multiple configuration modules can generate a first default table, and a second one of the multiple configuration modules can generated a second default table using, at least in part, the first table.

For instance, in an embodiment in which the firmware 112 complies with the UEFI specification, a PEI configuration module can generate a default HOB that associates modules in a PEI phase of the firmware 112 with respective first default masks. In addition, a DXE configuration module can generate, using the default HOB, a default table that relates modules in a DXE phase of the firmware 112 and respective second default masks.

As also disclosed herein, different levels of recordation of debugging messages can be established. Such levels can include, for example, global level of recordation, phase level of recordation, and module level of recordation. For global level of recordation in accordance with this disclosure, a selection of a group of types of debugging messages can apply to each one of the firmware components 114 that is executed during the execution of the firmware 112. Therefore, a one-to-many mapping can be configured between a data structure indicative or otherwise representative of the selection and the firmware components 114.

For a phase level of recordation as disclosed herein, a selection of a group of types of debugging messages can apply to a subset of the firmware components 114. The subset can include multiple firmware components and the selection applies to each one of the multiple firmware components. In one example, the subset can include the entirety of firmware components included in the execution of a SEC phase. In another example, the subset can include the entirety of firmware components included in the execution of a PEI phase. In yet another example, the subset can include the entirety of firmware components included in the execution of a DXE phase. In still another example, the subset can include the entirety of firmware components included in the execution of a BDS phase. More generally, the subset of firmware components can include a first entirety of firmware components included in the execution of a HOB-producer phase of the firmware 112, or a second entirety of firmware components included in a HOB-consumer phase of the firmware 112.

Accordingly, in the phase level of recordation, a one-to-many mapping can be configured between a data structure (e.g., a bitmask) indicative or otherwise representative of the selection and the multiple modules. Different subsets of the firmware components 114 (e.g., components in a PEI phase and components in a DXE phase) can have respective groups of data structures corresponding to respective selections of one or more types of debugging messages.

For a module level of recordation in accordance with aspect of this disclosure, a selection of a group of types of debugging messages can apply to a single firmware component of the firmware components 114. As such, a first one-to-one mapping can be configured between a first firmware component of the firmware components 114 and a first data structure indicative or otherwise representative of a selection of first types of debugging messages for recordation. In addition, or in the alternative, a second one-to-one mapping can be configured between a second firmware component of the firmware components 114 and a second data structure indicative or otherwise representative of a selection of second types of debugging messages for recordation.

Configuration or otherwise selection of a defined level of recordation of debugging messages adds flexibility to a debugging of the firmware 112. By adjusting the scope of recordation of debugging messages, embodiments of the disclosure are not limited to generating debugging information for the entirety of the execution of the firmware 112 in a debugging mode of operation.

Extant settings—either default settings configured at build-time or current settings configured at a runtime—contained in the debugging message settings 124 determine the availability of one or more types of debugging messages during the execution of the firmware 112 in a debugging mode of operation. Extant settings can include one or more mappings between modules of the firmware 112 and data structures indicative or otherwise representative of respective selections of types of debugging messages can be retained in the debugging message settings.

The extant settings can be updated at a runtime of the firmware 112 by, at least in part, updating the debugging message settings 124. To that end, the exemplified computing architecture 100 includes a display device 140 that can present a group of user interfaces (UIs) 150 to receive information for configuration of the availability of various types of debugging messages during the runtime of the firmware 112 in the debugging mode of operation. The CPU 130 can execute an interface setup module 118 to cause the display device 140 to present the group of UIs 150. In some embodiments, the display device 140 can present one or more first UIs to prompt the input of first information that defines a level of recordation of debugging messages during the execution of the firmware 112 in the debugging mode of operation. In addition, or in other embodiments, the display device 140 can present one or more second UIs to prompt the input of second information that defines one or more bitmasks (or, in some embodiments, another type of data structure) associated with respective components of a firmware. In FIG. 1, the first information and the second information can be herein referred to as "Scope" information and "Mask" information, respectively. As such, the first information and the second information are represented with respective arrows labeled "Scope" and "Mask."

The CPU 130 can receive the first information and/or the second information in response to execution of the interface setup module 118. Such information can be received via, for example, a coupling architecture 135 that can be specific to the architecture of a host computing device that includes the CPU 130 and the non-volatile memory device 110. In some embodiments, the coupling architecture 135 can include, for example, a PCI local bus, a PCI express (PCIe) bus, a PCI extended (PCI-X) bus, and/or a USB. In addition, or in other embodiments, the coupling architecture 135 can include other network elements, such as wireless elements and/or non-wireless elements, such as gateway devices, switch devices, network adapters, access point devices, wireline links, wireless links, a combination thereof, or the like.

Using at least the received information, the CPU 130 can update at least a group of data structures (e.g., bitmask(s), mapping(s), a combination thereof, or the like) indicative of the selection of a group of types of debugging messages. To that end, the CPU 130 can execute (or, in some instances, can continue executing) the debugging configuration module 116 to update an association between a module (or another type of component) of the firmware 112 and a data structure (e.g., a bitmask) retained in the debugging message settings 124. In some instances, for example, updating the association can include generating the association and adding the association to a table or another type of data structure representative of a mapping between modules and masks indicative of selection of types of debugging messages in accordance with this disclosure. In addition, or in other instances, updating the association can include replacing an extant association in the table or the other type of data structure.

More specifically, at build-time of firmware 112, the debugging configuration module 116 can provide a debugging configuration service that can permit updating a table within the debugging message settings 124 at a runtime of the firmware 112. As such, in one embodiment, the debugging configuration service provides one or more first application programming interfaces (APIs) or another type of interface. In order to update an association between a module of the firmware 112 and a mask indicative of a selection of one or more types of respective debugging messages, the CPU 130 can execute or continue executing the debugging configuration module 116 to implement a function call to an API of the first API(s).

In some embodiments, the debugging configuration service can include individual configuration services corresponding to respective portions of the firmware 112. For instance, in embodiments in which the firmware complies with the UEFI Specification, the debugging configuration service can include a PPI service and a Protocol service that correspond, respectively, to a PEI phase and a DXE phase of the firmware.

As an illustration, the PPI service can include a Set API and a Get API that permit or otherwise facilitate, respectively, updating and accessing the debugging message settings 124, at a runtime of the firmware 112, during execution of a PEI phase of the firmware 112. The PPI service can be configured as follows:

```
typedef struct_DEBUG_PRINT_ERROR_LEVEL_SER-
   VICE_PPI {
   GET_DEBUG_PRINT_ERROR_LEVEL GetPrintEr-
      rorLevel;
   SET_DEBUG_PRINT_ERROR_LEVEL SetPrintEr-
      rorLevel;
};
```
The Get API can be configured as follows:
```
/**
   Get configured Debug Print Error Level for a module
   @param This Pointer to Debug Print Error Level
      Service Ppi
   @param ModuleGuid Pointer to Module File Guid
   @param ErrorLevel Pointer to return current Debug
      Print Error Level mask for the current module
   @retval EFI_STATUS Returns Success if module is
      found in Database, else Not Found
**/
typedef
EFI_STATUS
   (EFIAPI *GET_DEBUG_PRINT_ERROR_LEVEL)
   (
   IN DEBUG_PRINT_ERROR_LEVEL_ SERVICE_
      PPI *This,
   IN EFI_GUID *ModuleGuid,
   IN OUT UINT32 *ErrorLevel
   );
```
In addition, the Set API can be configured as follows:
```
/**
   Set/Configure Debug Print Error Level for a module
   @param This Pointer to Debug Print Error Level
      Service Ppi
   @param ModuleGuid Pointer to Module File Guid
   @param ErrorLevel Debug Print Error Level mask to
      be Set/Configured for the current module
   @retval EFI_STATUS Returns Success if module is
      found in Database,
   else Not Found
**/
typedef
EFI_STATUS
   (EFIAPI *SET_DEBUG_PRINT_ERROR_LEVEL)
   (
   IN DEBUG_PRINT_ERROR_LEVEL_SERVICE_
      PPI *This,
   IN EFI_GUID *ModuleGuid,
   IN UINT32 ErrorLevel
   );
```
As another illustration, the Protocol service also can include a Set API and a Get API that permit or otherwise facilitate, respectively, updating and accessing the debugging message settings 124, at a runtime of the firmware 112, during execution of a DXE phase of the firmware 112. The Protocol service can be configured as follows:
```
typedef struct_DEBUG_PRINT_ERROR_LEVEL_SER-
   VICE_PROTOCOL {
   GET_DEBUG_PRINT_ERROR_LEVEL GetPrintEr-
      rorLevel;
   SET_DEBUG_PRINT_ERROR_LEVEL SetPrintEr-
      rorLevel;
};
```
The Set API and Get API for the Protocol service can be configured similar to those APIs for the PPI service.

Figure 3:
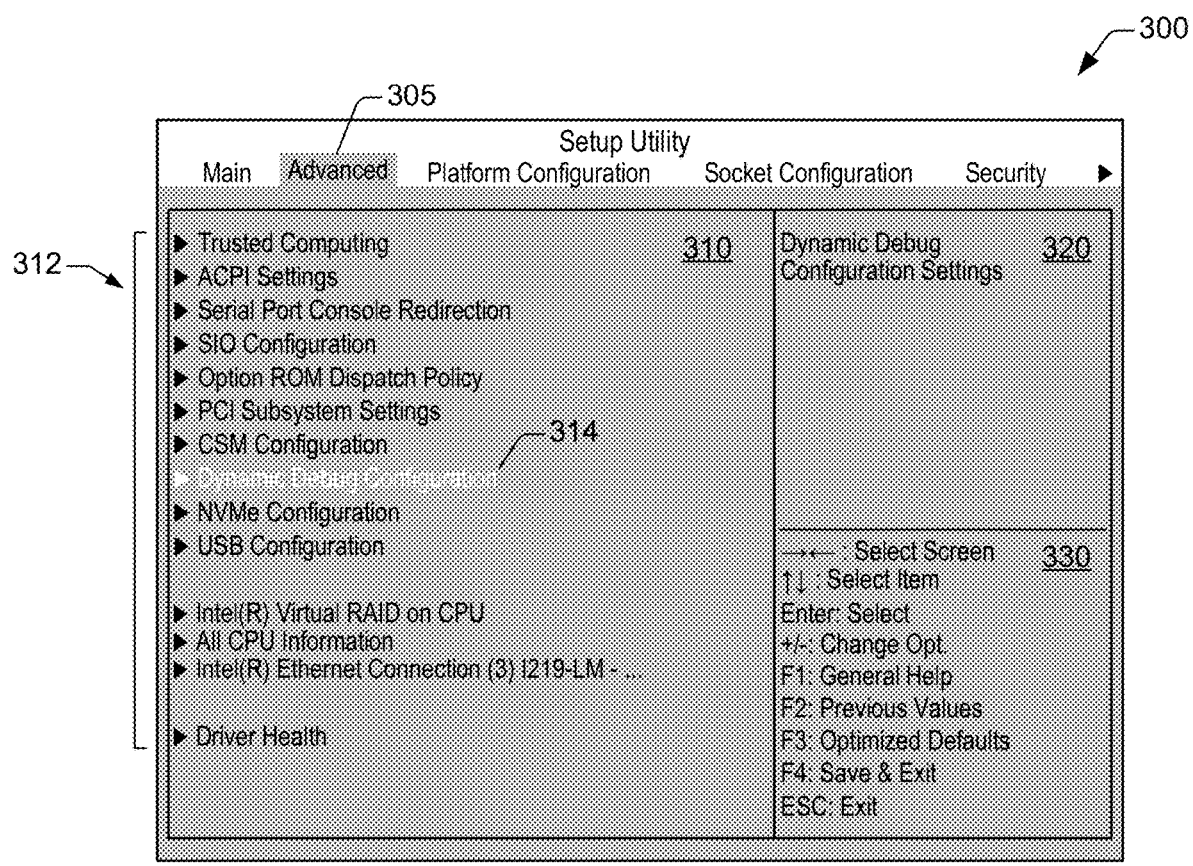
FIGS. 3 to 16 illustrate respective examples of user interfaces for dynamic configuration of availability of debugging messages during execution of a firmware in a debugging mode of operation, in accordance with one or more embodiments of the disclosure.

As an illustration, FIGS. 3-16 present examples of UIs that can permit or otherwise facilitate the configuration of availability of one or more types of debugging messages during the execution of the firmware 112 in a debugging mode of operation. In some scenarios, the CPU 130 can initiate execution of the firmware 112 and can receive an interruption signal (a defined keystroke signal, for example) to present a UI to configure various aspects of the firmware 112. The UI can include, for example, a selectable visual element that, when selected (e.g., upon or after being selected) can cause the CPU 130 to execute the interface setup module 118. In response, the CPU 130 can cause the display device 140 to present the UI 300 illustrated in FIG. 3.

The UI 300 includes a page 305 (labeled "Advanced" for the sake of nomenclature) having a first pane 310 that includes first selectable visual elements 312 for configuration of various aspects of the firmware 112. Either one of the first selectable visual elements 312 can be selected in numerous ways depending on the type of the display device 140, the CPU 130, and the interface setup module 118. For instance, an element of the first selectable visual elements 312 can be selected by means of one or more keystrokes; a mouse click; a gesture, such as a screen tap or a screen swipe; or a combination thereof.

The UI 300 also includes a second pane 320 that presents visual elements informative of at least some functionality that may be accessed by selecting one of the first selectable visual elements. The UI 300 further includes a third pane 330 having other visual elements indicative of defined keys that permit or otherwise facilitate navigation of the UI 300, selection of a selectable visual element, presentation of additional selectable visual elements in pane 310, and/or interactions with the first selectable visual elements 310.

Figure 4:
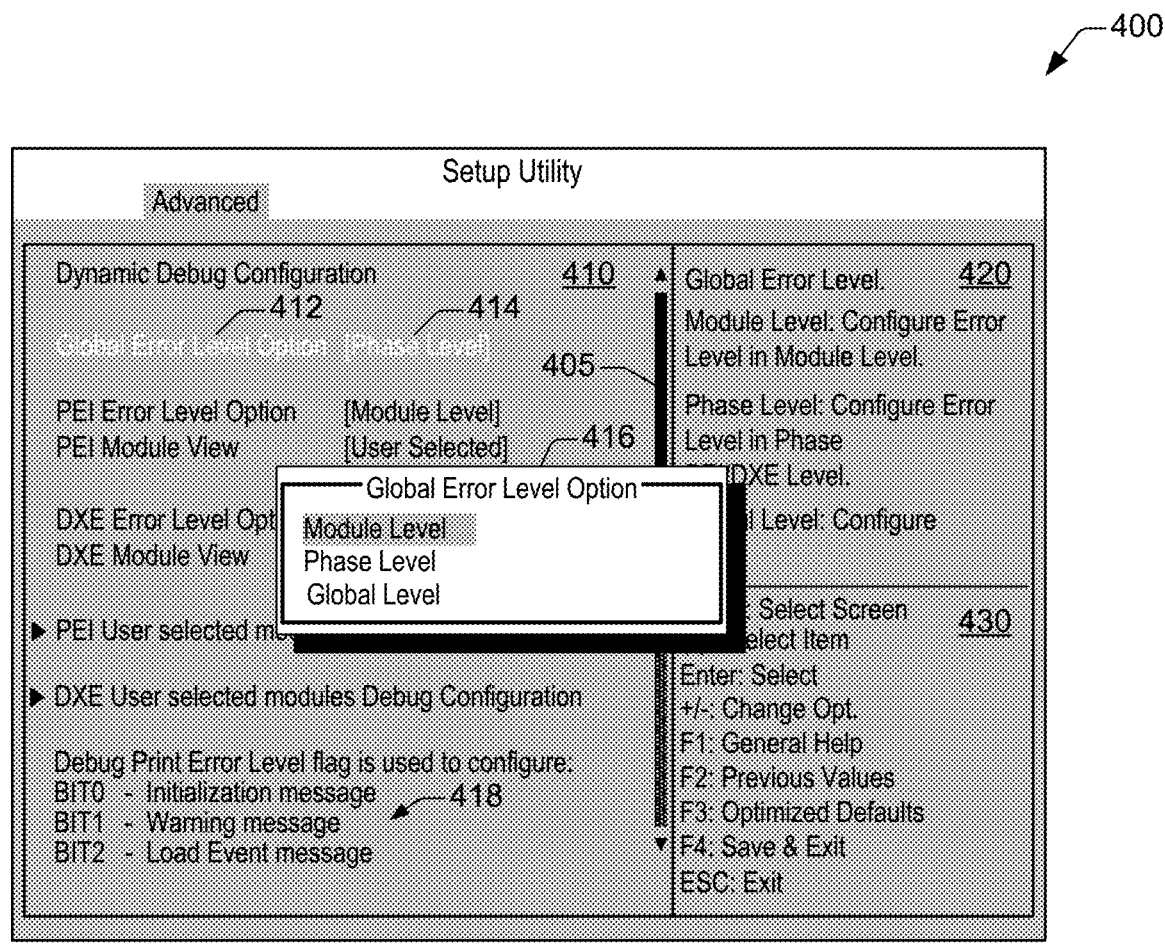

Selection of each one of the first selectable visual elements 312 can cause the display device 140 to present another UI that can prompt the input of configuration information. Specifically, selection of selectable visual element 314 (labeled "Dynamic Debug Configuration" for the sake of nomenclature) can cause the CPU 130 to execute or continue executing the interface setup module 118 to direct or otherwise cause the display device 140 to present a UI 400 as is illustrated in FIG. 4. The UI 400 includes a first pane 410 having multiple selectable visual elements for configuration of different levels of recordation of debugging messages. The first pane 410 also includes visual elements 418 that convey the type of debugging messages associated with a bit in a bitmask in accordance with this disclosure. See, e.g., FIG. 2 and associated description. Either one of the multiple selectable visual elements can be selected in numerous ways depending on the type of the display device 140, the CPU 130, and the interface setup module 118. For instance, an element of the multiple selectable visual elements can be selected by means of one or more keystrokes; a mouse click; a gesture, such as a screen tap or a screen swipe; or a combination thereof.

The UI 400 also includes a second pane 420 that presents visual elements informative of at least some functionality that may be accessed by selecting one of the first selectable visual elements. In addition, the UI 400 includes a third pane 430 having other visual elements indicative of defined keys that permit or otherwise facilitate navigation of the UI 400, presentation of additional selectable visual elements in pane 410, and/or interactions with the selectable visual elements in pane 410. The visual elements in pane 430 are essentially the same as those in pane 330.

The pane 410 includes a first selectable visual element 412 (labeled "Global Error Level Option" for the sake of nomenclature) that permits or otherwise facilitates configuring a level of recordation of debugging messages during a runtime of the firmware 112. The pane 410 also includes a visual element 414 that conveys an extant configuration for the level or recordation—phase level is depicted in FIG. 4, as an example.

Selection of the first selectable visual element 412 can cause the CPU 130 to execute or continue executing the interface setup module 118 to direct or otherwise cause the display device 140 to present a visual element 416. As is illustrated, the visual element 416 can be presented as an overlay on the pane 410, for example. The visual elements 416 includes third selectable visual elements, each one corresponding to a defined level of recordation. In particular, one of the third selectable visual elements can permit or otherwise facilitate setting the level of recordation to module level in accordance with this disclosure. Such an element is labeled "Module Level" in FIG. 4. Another one of the third selectable visual elements can permit or otherwise facilitate setting the level of recordation to phase level in accordance with this disclosure. Such an element is labeled "Phase Level" in FIG. 4. Yet another one of the third selectable visual elements can permit or otherwise facilitate setting the level of recordation to global level in accordance with this disclosure. Such an element is labeled "Level" in FIG. 4.

Figure 5:
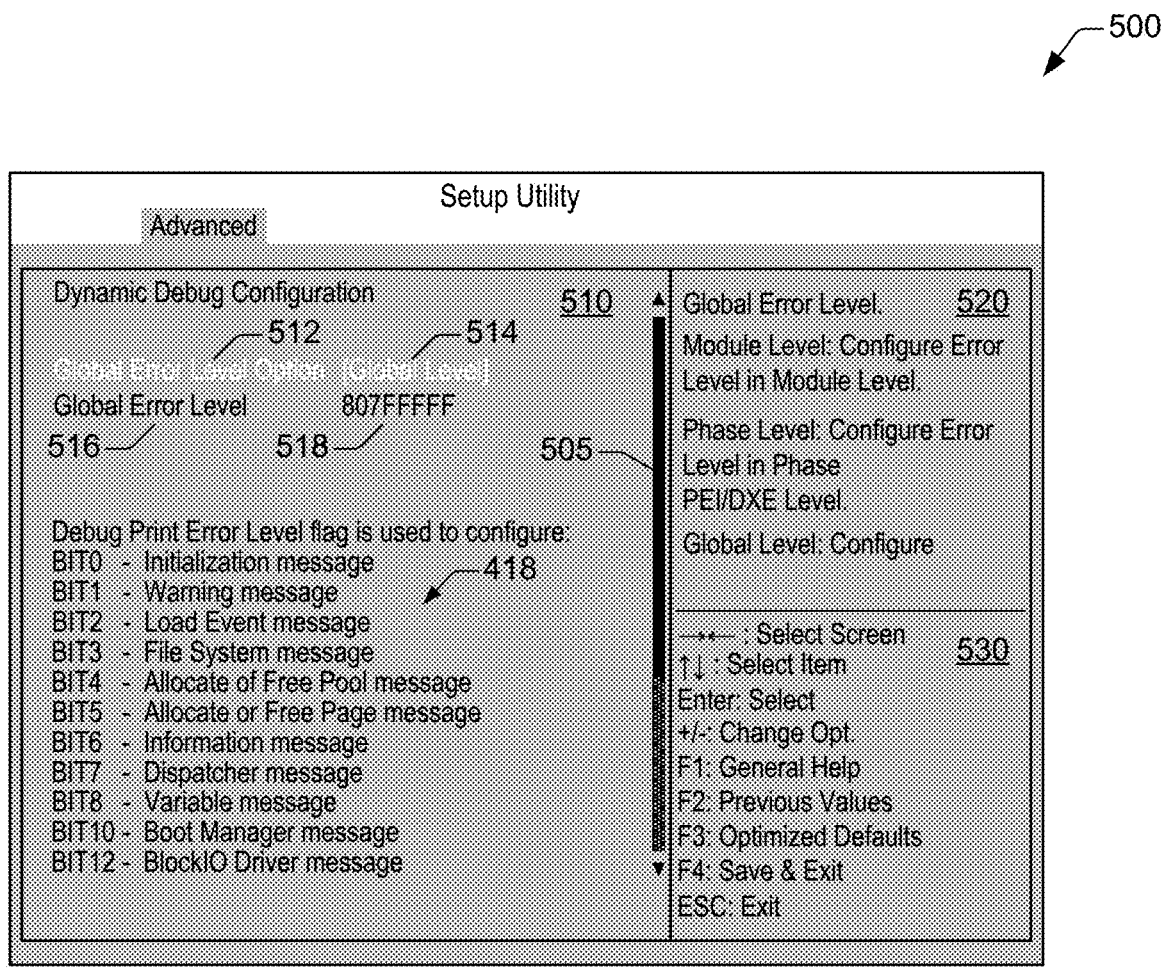

In one aspect, selection of the "Global Level" selectable visual element within visual element 416 in FIG. 4 can cause the CPU 130 to execute or continue executing the interface setup module 118 to direct or otherwise cause the display device 140 to present a UI 500 as is illustrated in FIG. 5. The UI 500 includes a first pane 510 that presents, amongst other elements, a selectable visual element 512 and a visual element 514. Selection of the selectable visual element 512 can permit or otherwise facilitate configuring a bitmask indicative of a selection of a group of types of debugging messages to be available during the execution of the firmware 112 in a debugging mode of operation.

The first pane 510 also includes a second visual element 516 and a third visual element 518 that convey a current bitmask for the global level of recordation. The bitmask is expressed in hexadecimal format, as an illustration. It is noted that the illustrated bitmask 807FFFFF corresponds to an example scenario in which bits $b23$ to $b30$ are reserved (see, e.g., FIG. 2) and are cleared. As such, an example range extends to a maximum of 807FFFFF. In such a scenario, the debugging configuration module 116 can permit configuring values of a bitmask in a range from 0 to 807FFFFF. The first pane 510 further includes visual elements 418 that convey the type of debugging messages associated with a bit in the bitmask represented by visual element 518. It is noted that in the illustrated example, bits $b_9$ and $b_{11}$ are reserved and, thus, are not included in the visual elements 418. A selectable visual element 505 can permit scrolling upwards and downwards to peruse the various types of debugging messages.

The UI 500 also includes a second pane 520 that presents visual elements informative of at least some functionality that may be accessed by selecting one of the first selectable visual elements. The visual elements in pane 520 are essentially the same as those in pane 420. In addition, the UI 500 includes a third pane 530 having other visual elements indicative of defined keys that permit or otherwise facilitate navigation of the UI 500, presentation of additional selectable visual elements in pane 510, and/or interactions with the selectable visual elements in pane 510. The visual elements in pane 530 are essentially the same as those in pane 430.

Figure 6:
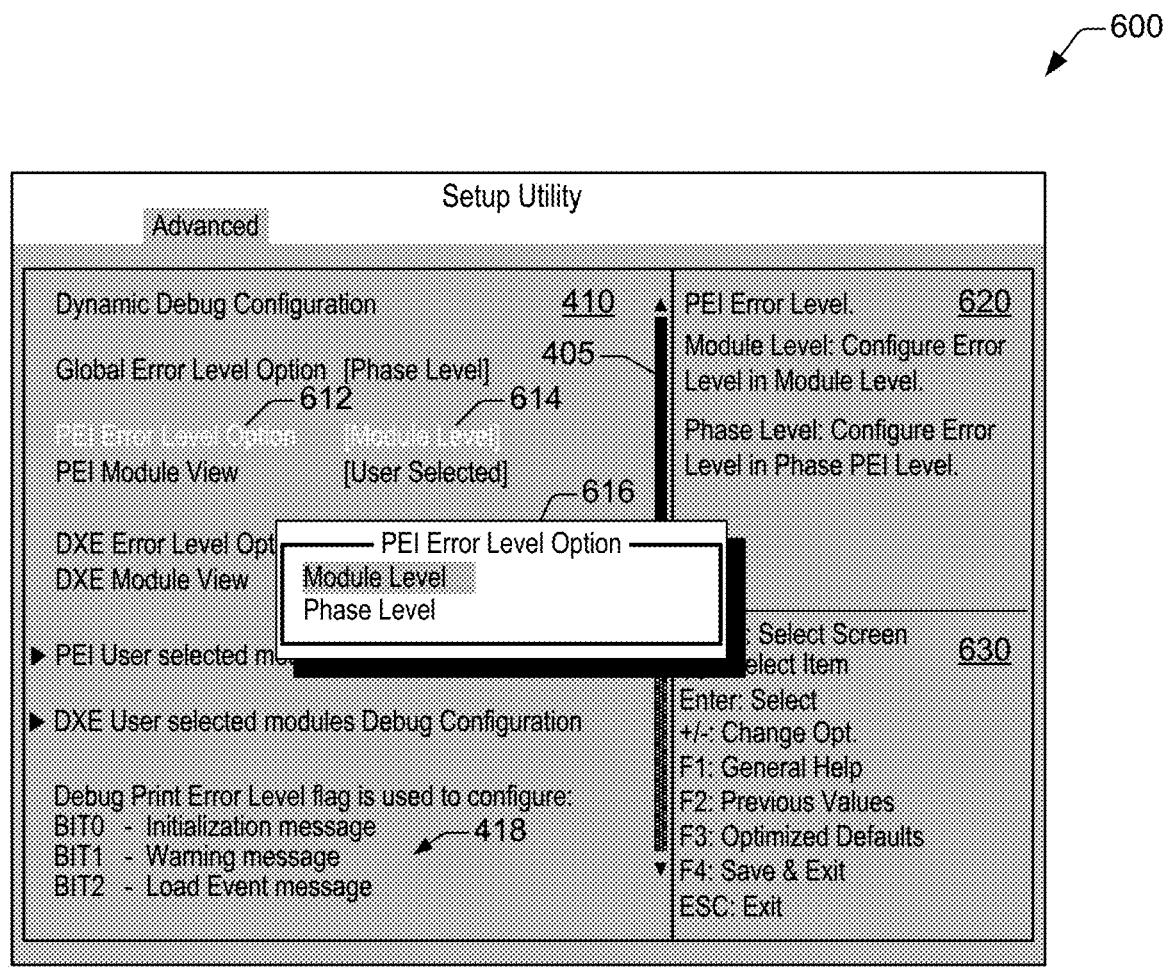

With further reference to FIG. 4, in another aspect, selection of the "Phase Level" selectable visual element within visual element 416 can cause the CPU 130 to execute or continue executing the interface setup module 118 to direct or otherwise cause the display device 140 to present a UI 600 as is illustrated in FIG. 6. The UI 600 includes the first pane 410, which presents a first selectable visual element 612 that permits or otherwise facilitates configuring a level of recordation of debugging messages for a portion of the firmware 112, during a runtime of the firmware 112. For the sake of illustration, the portion of the firmware 112 corresponds to a PEI phase, in an embodiment in which the firmware 112 complies with the UEFI Specification. As such, the selectable visual element 612 is labeled "PEI Error Level Option," for the sake of nomenclature. The pane 410 also includes a visual element 614 that conveys an extant configuration for the level or recordation for the PEI phase—module level is depicted in FIG. 6, as an example.

Selection of the first selectable visual element 612 can cause the CPU 130 to execute or continue executing the interface setup module 118 to direct or otherwise cause the display device 140 to present a visual element 616. As is illustrated, the visual element 616 can be presented as an overlay on the pane 410, for example. The visual element 616 includes second selectable visual elements, each one corresponding to a defined level of recordation for the phase of the firmware 112 (e.g., a PEI phase) for which one or more types of debugging messages are being configured. One of the second selectable visual elements included in visual element 616 can permit or otherwise facilitate setting the level of recordation to module level in accordance with this disclosure. Another one of such second selectable visual elements can permit or otherwise facilitate setting the level of recordation to phase level (or complete level) in accordance with this disclosure.

The UI 600 also includes a second pane 620 that presents visual elements informative of configuration aspects that can be adjusted by utilizing elements presented in the pane 410. The pane 620 also can be presented in response to the selection of the first selectable visual element 612. It is noted that the selection that causes presentation of the visual elements in the pane 620 can be different from the other selection that causes the presentation of the visual element 616.

The UI 600 includes a pane 630 having other visual elements indicative of defined keys that permit or otherwise facilitate navigation of the UI 600, presentation of additional selectable visual elements in pane 410, and/or interactions with the selectable visual elements in pane 410. The visual elements in pane 630 are essentially the same as those in pane 430.

In embodiments in which the firmware 112 complies with the UEFI Specification, the firmware 112 also can include a DXE phase. Therefore, as is illustrated in the UI 700 shown in FIG. 7, the pane 410 can include a second selectable visual element 712 that permits or otherwise facilitates configuring a level of recordation of debugging messages for a second portion of the firmware 112, during a runtime of the firmware 112. The second portion corresponds to the DXE phase, as an example. Thus, while not fully visible in FIG. 7, the selectable visual element 712 is labeled "DXE Error Level Option," for the sake of nomenclature. Although it is not shown in FIG. 7, the pane 410 also can include a visual element that conveys an extant configuration for the level or recordation for the DXE phase.

Selection of the second selectable visual element 712 can cause the CPU 130 to execute or continue executing the interface setup module 118 to direct or otherwise cause the display device 140 to present a visual element 716. As is illustrated, the visual element 716 can be presented as an overlay on the pane 410, for example. The visual element 716 includes second selectable visual elements, each one corresponding to a defined level of recordation for the phase of the firmware 112 (e.g., a DXE phase) for which one or more types of debugging messages are being configured. One of the second selectable visual elements included in visual elements 716 can permit or otherwise facilitate setting the level of recordation to module level in accordance with this disclosure. Another one of such second selectable visual elements can permit or otherwise facilitate setting the level of recordation to phase level (or complete level) in accordance with this disclosure.

The UI 700 also includes a second pane 720 that presents visual elements informative of configuration aspects that can be adjusted by utilizing elements presented in the pane 410. The second pane 720 also can be presented in response to the selection of the first selectable visual element 712. It is noted that the selection that causes presentation of the visual elements in the pane 720 can be different from the other selection that causes the presentation of the visual element 716.

In addition, the UI 700 includes a pane 730 having other visual elements indicative of defined keys that permit or otherwise facilitate navigation of the UI 700, presentation of additional selectable visual elements in pane 410, and/or interactions with the selectable visual elements in pane 410. The visual elements in pane 730 are essentially the same as those in pane 430.

Figure 7:
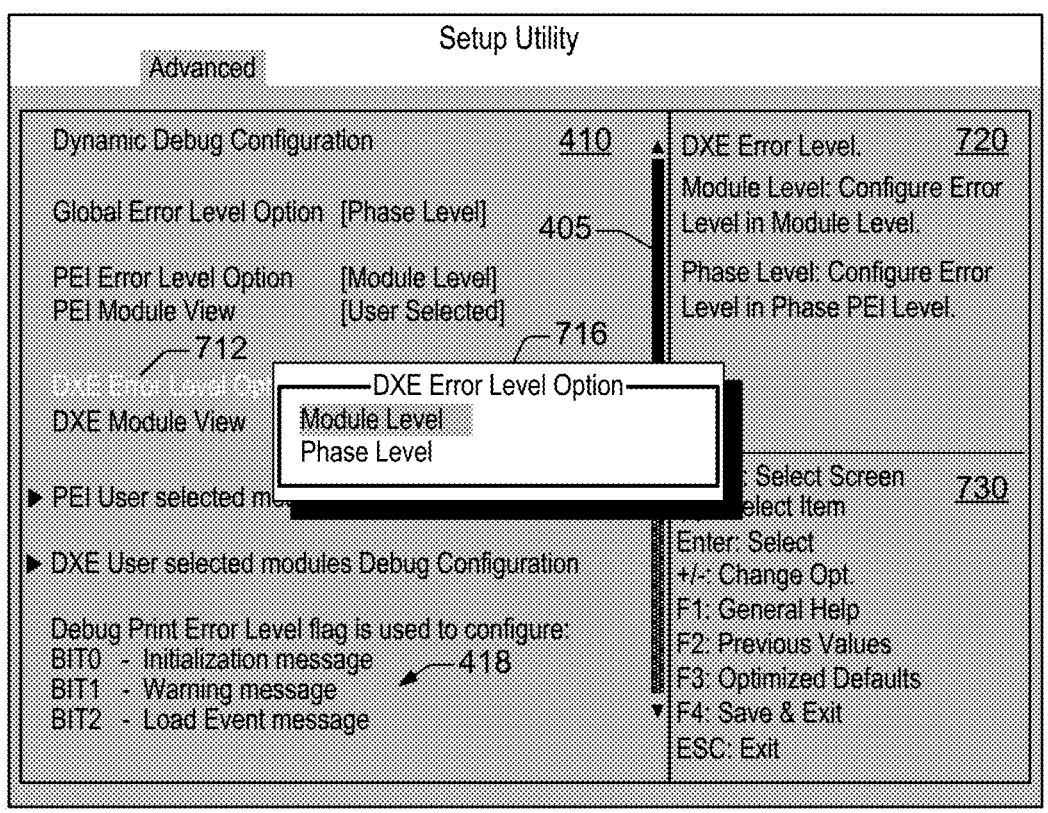
Figure 8:
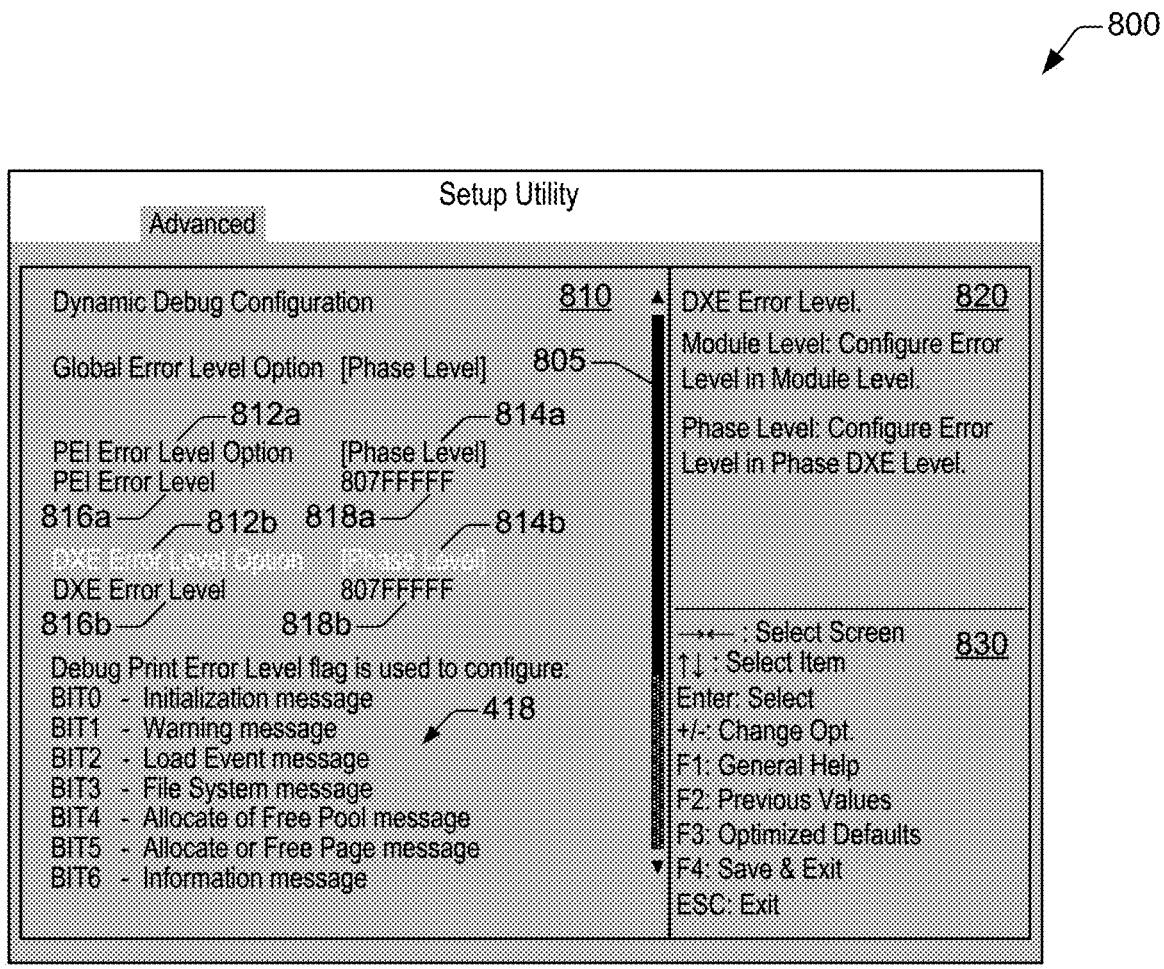

Selection of the "Phase Level" selectable visual element within the visual element 716 in FIG. 7 can cause the CPU 130 to execute or continue executing the interface setup module 118 to direct or otherwise cause the display device 140 to present a UI 800 as is illustrated in FIG. 8. The UI 800 includes a first pane 810 that presents, amongst other elements, a selectable visual element 812b and a visual element 814b indicative of a selected level of recordation—phase level in the UI 800. Selection of the selectable visual element 812b can permit or otherwise facilitate configuring a bitmask indicative of a selection of a group of types of debugging messages to be available during the execution of the firmware 112 in a debugging mode of operation. In view of the selection of phase level of level of recordation, as is disclosed herein, the bitmask is associated with each module that is included in the DXE phase of the firmware 112.

The first pane 810 further includes a visual element 816b and a visual element 818b that convey a current bitmask for the selected level of recordation, e.g., phase level of recordation. The bitmask is expressed in hexadecimal format, as an illustration. The first pane 810 further includes visual elements 418 that, as described herein, convey the type of debugging messages associated with a bit in the bitmask represented by visual element 818b. A selectable visual element 805 can permit scrolling upwards and downwards to peruse the various types of debugging messages.

The UI 800 also includes a second pane 820 that presents visual elements informative of configuration aspects related to configuration of types of debugging messages available during execution of a DXE phase of the firmware 112. In addition, the UI 800 includes a third pane 830 having other visual elements indicative of defined keys that permit or otherwise facilitate navigation of the UI 800, presentation of additional selectable visual elements in pane 810, and/or interactions with the selectable visual elements in pane 810. The visual elements in pane 830 are essentially the same as those in pane 430.

It is noted that the UI 800 also can be presented in response to selection of the "Phase Level" selectable element presented in visual element 616 in FIG. 6. Therefore, the first pane 810 in FIG. 8 also includes a selectable visual element 812a. Selection of the selectable visual element 812a can permit or otherwise facilitate configuring a bitmask indicative of a selection of a group of types of debugging messages to be available during the execution of a PEI phase of the firmware 112 in a debugging mode of operation. The UI 800 also includes a visual element 814a indicative of a selected level of recordation—phase level in the UI 800.

The UI 800 further includes a visual element 816a and a visual element 818a. The visual element 818a conveys a current configuration of a bitmask associated with the selected level of recordation, e.g., phase level of recordation. The bitmask is expressed in hexadecimal format, as an illustration. The first pane 810 further includes, as mentioned, visual elements 418 that convey the type of debugging messages associated with a bit in the bitmask represented by visual element 818a and a bit in the bitmask represented by visual element 818b. In view of the selection of phase level of level of recordation, as is disclosed herein, the bitmask is associated with each module that is included in the PEI phase of the firmware 112.

With further reference to FIG. 4, as mentioned, visual element 416 includes a "Module Level" selectable visual element that can permit or otherwise facilitate configuring the level of recordation to module level in accordance with this disclosure. Similarly, as disclosed herein in connection with FIG. 6 and FIG. 7, after phase level of recordation (either PEI phase level or DXE phase level, for example) is selected, a module level of recordation also can be configured by selecting suitable "Module Level" selectable visual elements.

Figure 9:
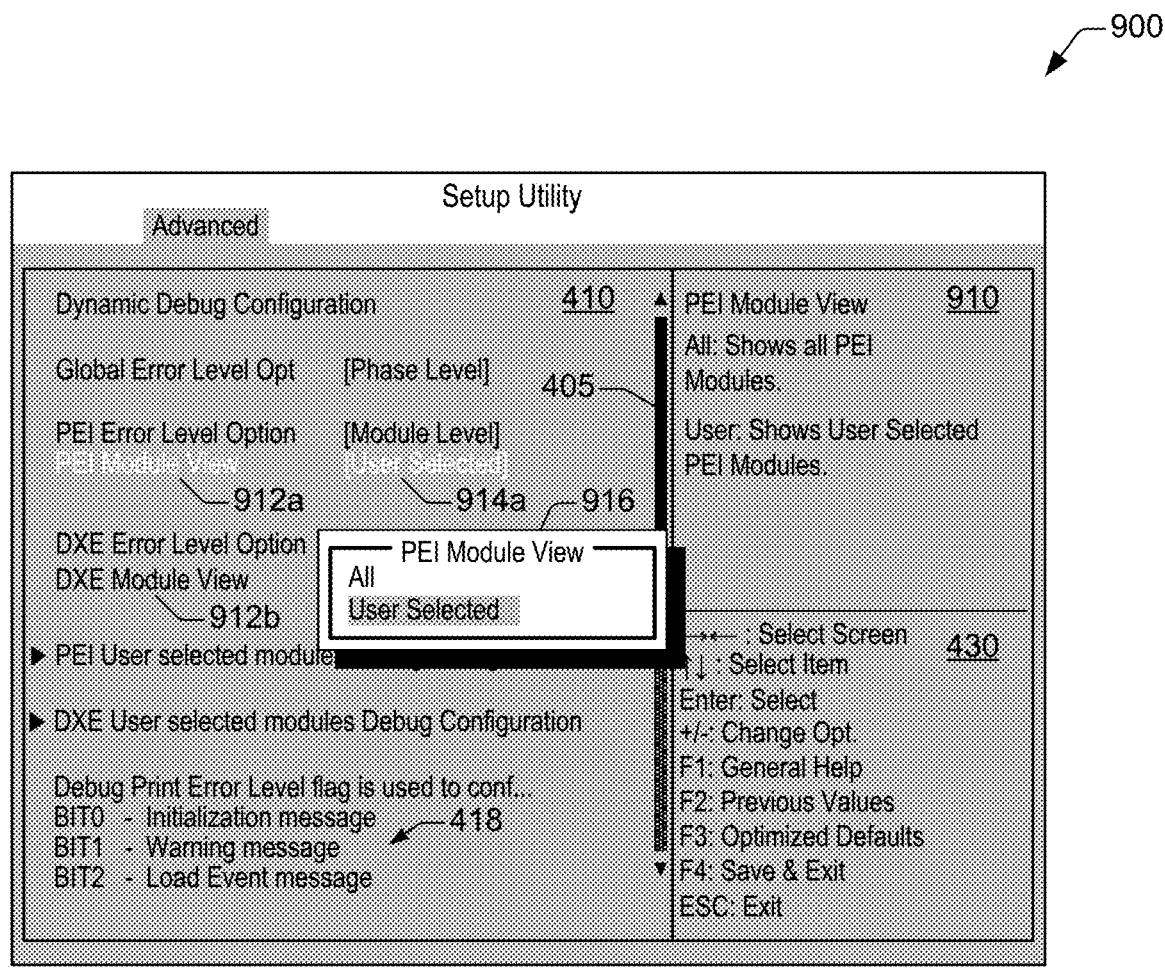

More specifically, selection of the "Module Level" selectable visual element in element 616 in FIG. 6 can cause the CPU 130 to execute or continue executing the interface setup module 118 to direct or otherwise cause the display device 140 to present a UI 900 as is illustrated in FIG. 9. The UI 900 includes the pane 410, which includes a first selectable visual element 912a and a second visual element 912b. The pane 410 also includes a visual element 914a indicative of a selected level of recordation—user selected, in the UI 900.

Selection of the first selectable visual element 912a can cause the CPU 130 to execute or continue executing the interface setup module 118 to direct or otherwise cause the display device 140 to present a visual element 916. As is illustrated in FIG. 9, the visual element 916 can be presented as an overlay on the pane 410, for example. The visual element 916 includes third selectable visual elements, each one corresponding to a defined scope of configuration of the module level of recordation of type(s) of debugging messages in accordance with this disclosure. Specifically, one of the third selectable visual elements included in visual element 916 can permit or otherwise facilitate configuring a defined bitmask for each one of the modules included in a PEI phase of the firmware 112, for example. Such a selectable visual element is labeled "All" in UI 900.

The other one of such third selectable visual elements can permit or otherwise facilitate configuring one or more bitmasks for respective custom-selected modules (or other types of components) of the firmware 112. In one embodiment, the custom-selected module(s) can be determined using at least end-user input information. Accordingly, such selectable visual element is labeled "User Selected," for the sake of nomenclature.

The UI 900 further includes a second pane 910 that presents visual elements informative of configuration aspects that can be adjusted by utilizing elements presented the pane 410. The second pane 910 also can be presented in response to the selection of the first selectable visual element 912*a*. It is noted that the selection that causes presentation of the visual elements in the pane 910 can be different from the other selection that causes the presentation of the visual element 916.

Figure 10:
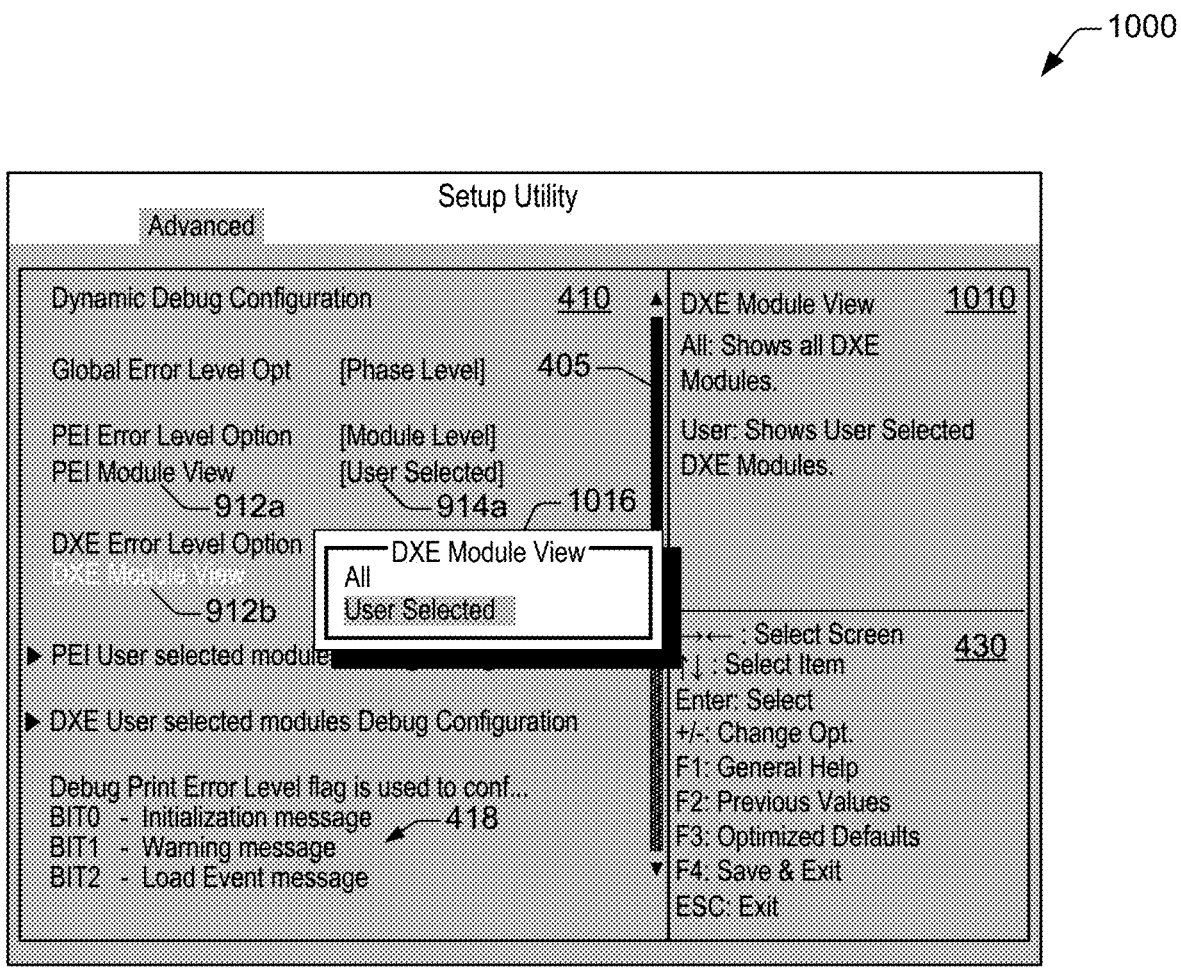

Selection of the second selectable visual element 912*b* in the UI 900 can cause the CPU 130 to execute or continue executing the interface setup module 118 to direct or otherwise cause the display device 140 to present a visual element 1016, as is shown in UI 1000 illustrated in FIG. 10. The visual element 1016 can be presented as an overlay on the pane 410, for example.

The visual element 1016 includes selectable visual elements similar to other selectable visual elements that permit or otherwise facilitate the configuration of availability of a group of types of respective debugging messages for a module level of recordation, within a DXE phase of the firmware 112. Each one of such selectable visual elements corresponds to a defined scope of configuration of the module level of recordation of type(s) of debugging messages in accordance with this disclosure. Specifically, one of the selectable visual elements included in visual element 1016 can permit or otherwise facilitate configuring a defined bitmask for each one of the modules included in a DXE phase of the firmware 112, for example. Such a selectable visual element is labeled "All" in the UI 1000.

The other one of the selectable visual elements within element 1016 can permit or otherwise facilitate configuring one or more bitmasks for respective custom-selected modules of the firmware 112. In some embodiments, the custom-selected module(s) can be determined using at least end-user input information. Accordingly, such selectable visual element is labeled "User Selected," for the sake of nomenclature.

Figure 11:
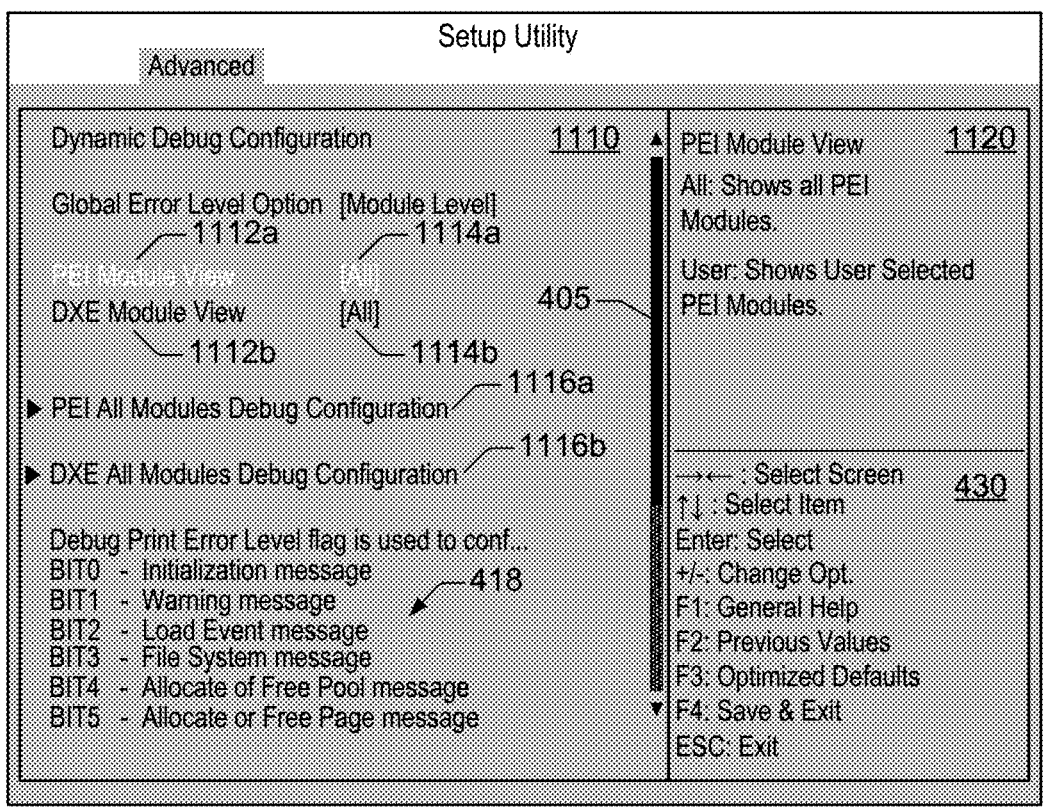

FIG. 11 presents a UI 1100 that can be presented in response to selection of one of the "All" selectable visual element included in element 916 in FIG. 9 or "All" selectable element 1016 in FIG. 10. As is illustrated in FIG. 11, the UI 1100 includes a first pane 1110 having a first selectable visual element 1112*a* that permits or otherwise facilitates configuring first bitmasks for respective first modules included in a PEI phase of the firmware 112. Thus, the first selectable visual element 1112*a* is labeled "PEI Module View," for the sake of nomenclature. As mentioned, the PEI phase is utilized simply as an illustration, and other UIs similar to UI 1100 can be presented or otherwise made available for other phases of the firmware 112. The pane 1110 also includes a visual element 1114*a* that conveys a current selection for a desired type of configuration of such first bitmasks—"All" is depicted in FIG. 11, as an example.

In addition, the UI 1100 includes a second selectable visual element 1112*b* that permits or otherwise facilitates configuring second bitmasks for respective second modules included in a DXE phase of the firmware 112. Thus, the second selectable visual element 1112*a* is labeled "DXE Module View," for the sake of nomenclature. As mentioned, the DXE phase is utilized simply as an illustration, and other UIs similar to UI 1100 can be presented or otherwise made available for other phases of the firmware 112. The pane 1110 also includes a visual element 1114*b* that conveys a current selection for a desired type of configuration of such second bitmasks—"All" is depicted in FIG. 11, as an example.

The UI 1100 further includes a second pane 1120 that presents visual elements informative of configuration aspects that can be adjusted by utilizing elements presented the pane 1110. The second pane 1120 also can be presented in response to the selection of the first selectable visual element 1112*a*. The second pane 1120 includes essentially the same elements as those included in pane 910 shown in FIG. 9.

Figure 12:
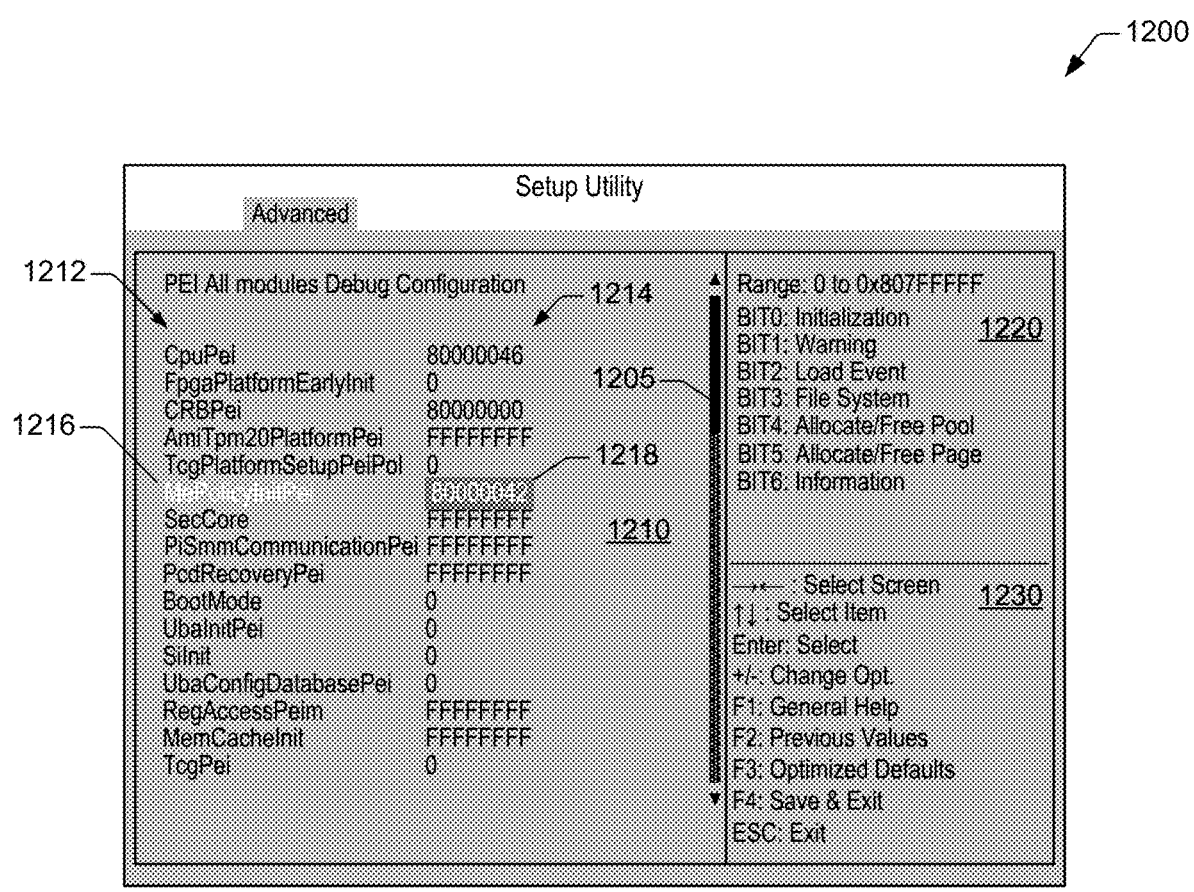

The UI 1100 also includes a selectable visual element 1116*a*, labeled "PEI All modules Debug Configuration" for the sake of nomenclature. Selection of the selectable visual element 1116*a* can cause the CPU 130 to execute or continue executing the interface setup module 118 to direct or otherwise cause the display device 140 to present a UI 1200 as is illustrated in FIG. 12. The UI 1200 includes selectable visual elements 1212 indicative of a listing of modules included in the PEI phase of the firmware 112, in an embodiment in which the firmware 112 complies with the UEFI Specification.

Specifically, execution of the interface setup module 118 can cause the CPU 130 to access the debugging message settings 124 and identify module names for the PEI phase. To that point, for example, the CPU 130 can implement a function call that supplies one or more module names. The function call can be included in a library provided by the interface setup module 118. The identified module names constitute the listing of modules. Using at least the identified module names, execution of the interface setup module 118 can cause the CPU 130 to direct the display device 140 to present the selectable visual elements 1212.

In one aspect, the listing of modules includes all modules in the PEI phase. Thus, the UI 1200 includes a second selectable element 1205 that permits perusing the listing of elements by scrolling upward and scrolling downward to update the visible elements in the listing of modules.

As mentioned, other UIs similar to UI 1200 can be presented or otherwise made available for other portions of the firmware 112. Further, the particular modules and the order in which modules are listed in the pane 1210 in FIG. 12 is merely illustrative. The selectable visual elements 1212 include respective editable sections 1214. Each one of the editable sections 1214 conveys a current setting of a bitmask pertaining to a module in the listing of modules.

Execution of the interface setup module 118 can cause the CPU 130 to access the debugging message settings 124 and identify one or more current bitmasks for respective modules. To this end, in one embodiment, the CPU 130 can implement a function call that supplies the current bitmask(s). The function call can be included in a library provided by the interface setup module 118. Using at least the current bitmask(s), execution of the interface setup module 118 can cause the CPU 130 to direct the display device 140 to present the applicable content (e.g., a defined hexadecimal value) in each one of the editable sections 1214.

Selection of a first selectable visual element 1216 of the selectable visual elements 1212 can cause the CPU 130 to execute or continue executing the interface setup module 118 to direct or otherwise cause the display device 140 to highlight, for example, an editable section 1218 of the editable sections 1214. The editable section 1218 can be highlighted in order to update a bitmask pertaining to a module associated with the first selectable visual element 1216. The editable section 1218 can receive input information to edit an extant value of the bitmask. For instance, the example hexadecimal value "80000042" can be changed to a new value. The input information indicative of the new value can constitute at least a portion of Mask information that can be sent by the display device 140 to the CPU 130 (refer to FIG. 1, for example). The new value can be utilized to update the debugging message settings 124, via the debugging configuration module 116, in one embodiment, in accordance with aspects described herein. In another embodiment, the new value can be utilized to update the debugging message settings 124 via the interface setup module 118.

A pane 1220 can include a visual element indicative of a range of permissible values for a bitmask. The pane 1220 also includes visual elements informative of the types of debugging messages corresponding to respective bits in the bitmask. Refer also to FIG. 2.

Figure 13:
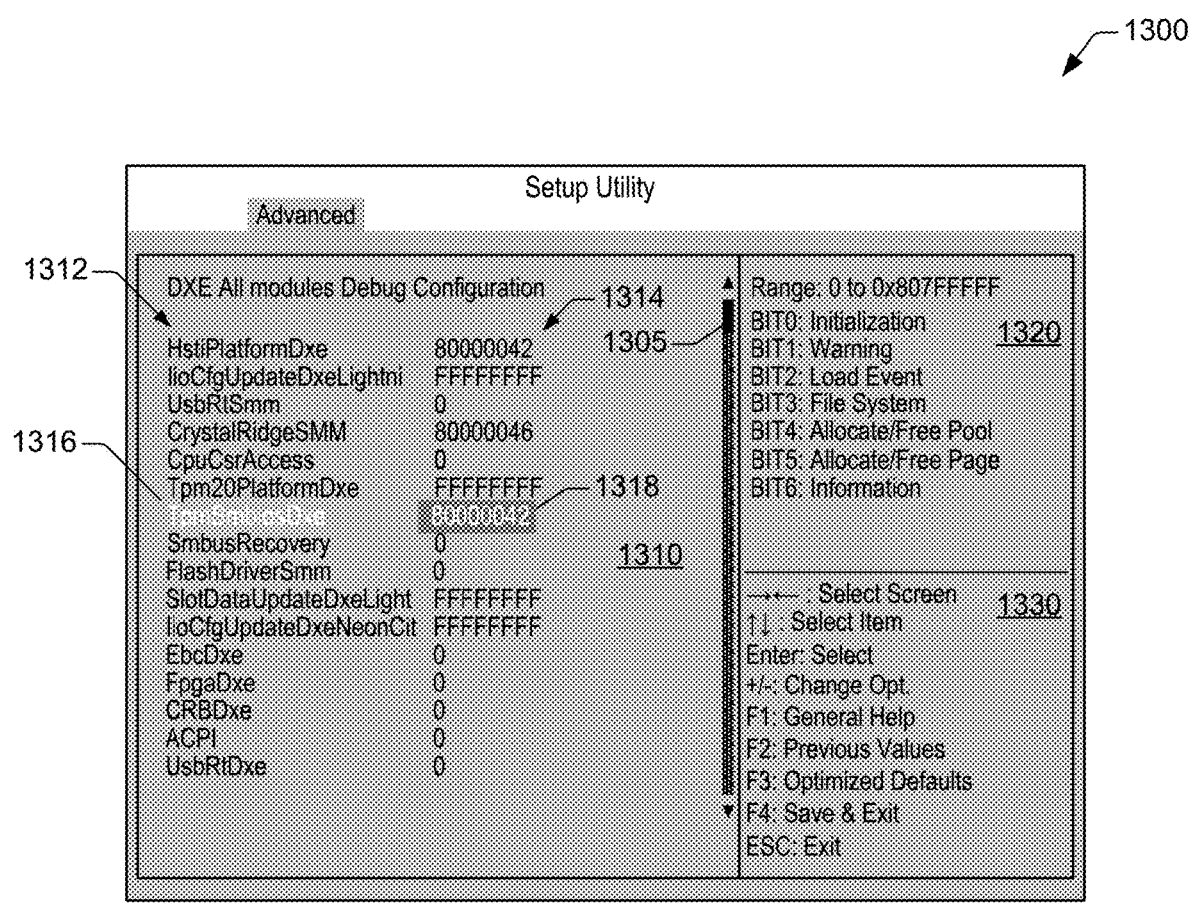

Back to FIG. 11, the UI 1100 also include a selectable visual element 1116*b*, labeled "DXE All Modules Debug Configuration" for the sake of nomenclature. Selection of the selectable visual element 1116*b* can cause the CPU 130 to execute or continue executing the interface setup module 118 to direct or otherwise cause the display device 140 to present a UI 1300 as is illustrated in FIG. 13. The UI 1300 includes selectable visual elements 1312 indicative of a listing of modules included in a DXE phase of the firmware 112, in the embodiment in which the firmware 112 complies with the UEFI Specification. In one aspect, the listing of elements includes all modules in the DXE phase. A second selectable element 1305 can permit perusing the listing of elements by scrolling upward and scrolling downward to update the visible elements of the listing of modules.

As disclosed herein, execution of the interface setup module 118 can cause the CPU 130 to access the debugging message settings 124 and identify one or more current bitmasks for respective modules. To that end, in one embodiment, the CPU 130 can implement a function call that supplies the current bitmask(s). The function call can be included in a library provided by the interface setup module 118. Using at least the current bitmask(s), execution of the interface setup module 118 can cause the CPU 130 to direct the display device 140 to present the applicable content (e.g., a defined hexadecimal value) in each one of the editable sections 1314.

As mentioned, other UIs similar to UI 1300 can be presented or otherwise made available for other portions of the firmware 112. Further, the particular modules and the order in which modules are listed in the pane 1310 in FIG. 13 is merely illustrative. The selectable visual elements 1312 include respective editable section 1314. Each one of the editable sections 1314 conveys a current setting of a bitmask pertaining to a module in the listing of modules.

Selection of a first selectable visual element 1316 of the selectable visual elements 1312 can cause the CPU 130 to execute or continue executing the interface setup module 118 to direct or otherwise cause the display device 140 to highlight, for example, an editable section 1318 of the editable sections 1314. The editable section 1318 can be highlighted in order to update a bitmask pertaining to a module associated with the first selectable visual element 1316. The first editable section 1318 can be edited in order to update an extant value of the bitmask. For instance, the example hexadecimal value "80000042" can be changed to a new value. The input information indicative of the new value can constitute at least a portion of Mask information that can be sent by the display device 140 to the CPU 130 (refer to FIG. 1, for example). The new value can be utilized to update the debugging message settings 124, via the debugging configuration module 116, in one embodiment, in accordance with aspects described herein. In another embodiment, the new value can be utilized to update the debugging message settings 124 via the interface setup module 118.

The UI 1300 also includes a pane 1320 having a visual element indicative of a range of permissible values for a bitmask. The pane 1320 also includes visual elements informative of the types of debugging messages corresponding to respective bits in the bitmask. Refer also FIG. 2.

Figure 14:
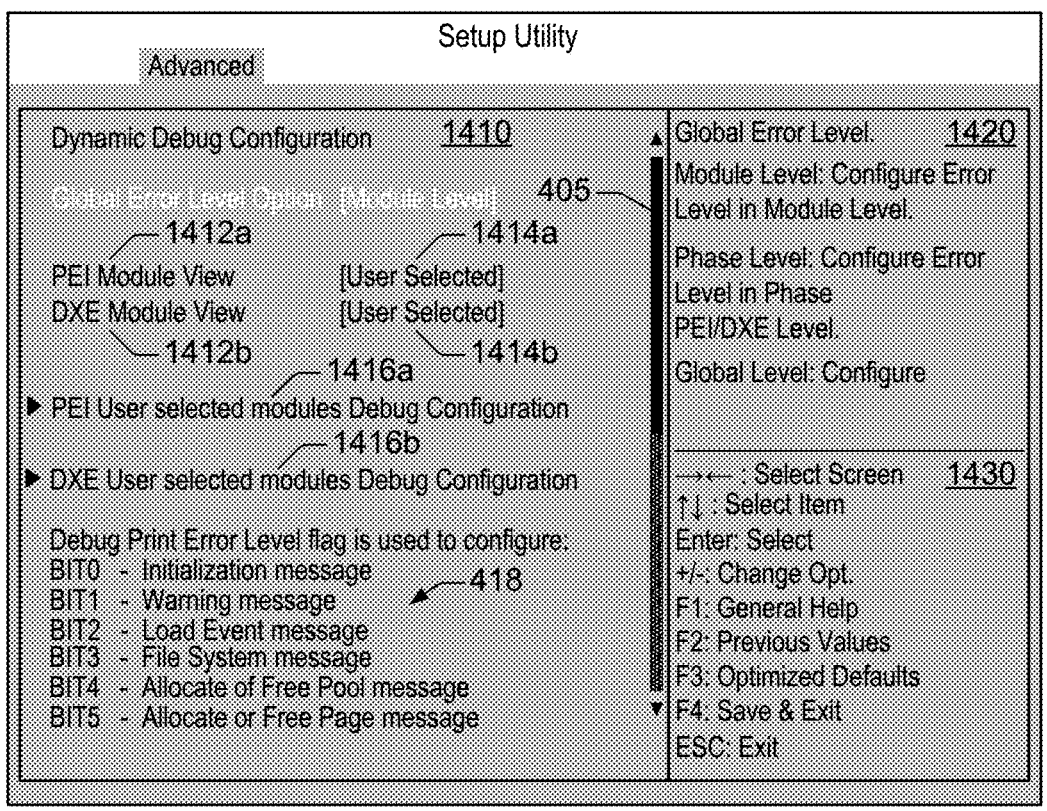

FIG. 14 presents an example UI 1400 that can be presented in response to selection of one of the "User Selected" selectable visual element included in element 916 in FIG. 9 or "User Selected" selectable element 1016 in FIG. 10. As is illustrated in FIG. 14, the UI 1400 a first pane 1410 having a first selectable visual element 1412*a* that permits or otherwise facilitates configuring first bitmasks for respective first modules included in a PEI phase of the firmware 112, in an embodiment in which the firmware 112 complies with the UEFI Specification. In one aspect, the first modules can correspond to a first defined subset of the entirety of modules contained in the PEI phase of the firmware 112. The pane 1410 also includes a visual element 1414*a* that conveys a current selection for a desired type of configuration of such first bitmasks—"User Selected" is depicted in FIG. 14, as an example.

Such a first defined subset of the entirety of modules contained in the PEI phase of the firmware 112 can be configured, for example, using at least in part end-user input information. To that end, the pane 1410 includes a second selectable visual element 1416*a* that, in response to selection, can cause the CPU 130 to execute or continue executing the interface setup module 118 to direct or otherwise cause the display device 140 to present another UI (not depicted) to select the first defined subset of modules. It is noted, that the PEI phase is utilized simply as an illustration, and other UIs similar to UI 1400 can be presented or otherwise made available for other phases of the firmware 112.

The UI 1400 also includes a third selectable visual element 1412*b* that permits or otherwise facilitates configuring second bitmasks for respective second modules included in a DXE phase of the firmware 112. In one aspect, the second modules can correspond to a second defined subset of the entirety of modules contained in the DXE phase. The pane 1410 also includes a visual element 1414*b* that conveys a current selection for a desired type of configuration of such second bitmasks—"User Selected" is depicted in FIG. 14, as an example. As mentioned, the DXE phase is utilized simply as an illustration, and other UIs similar to UI 1400 can be presented or otherwise made available for other phases of the firmware 112.

Such a second defined subset of the entirety of modules contained in the DXE phase can be configured, for example, using at least in part end-user input information. To that end, the pane 1410 includes a fourth selectable visual element 1416*b* that, in response to selection, can cause the CPU 130 to execute or continue executing the interface setup module 118 to direct or otherwise cause the display device 140 to present another UI (not depicted) to select the second defined subset of modules.

The UI 1400 further includes a second pane 1420 that presents visual elements informative of configuration aspects that can be adjusted by utilizing elements presented the pane 1410. The second pane 1420 also can be presented in response to the selection of the first selectable visual element 1412*a*. The second pane 1420 includes essentially the same elements as those included in pane 420 shown in FIG. 4. It is noted that the selection that causes presentation of the visual elements in the pane 1420 can be different from the other selection that causes the presentation of the visual element 416.

Figure 15:
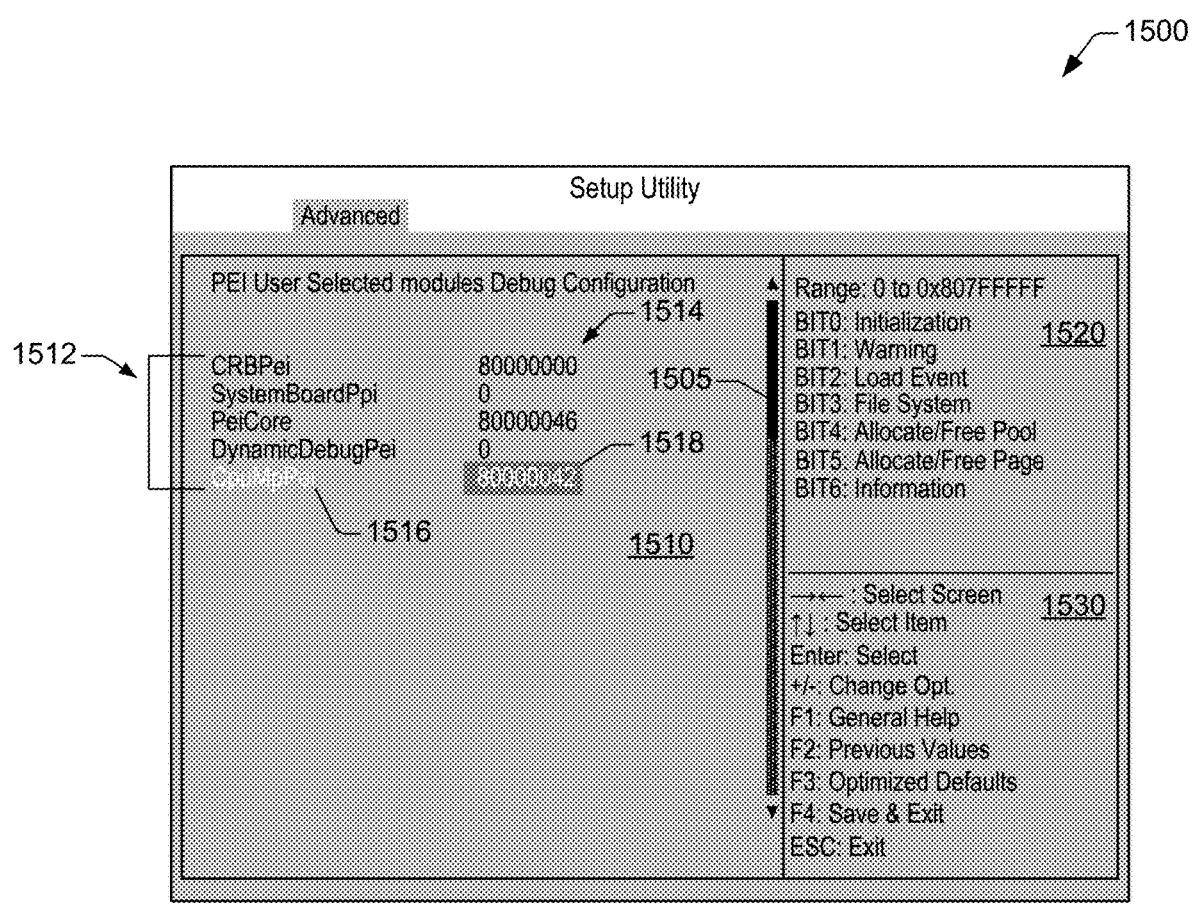

Selection of the first selectable visual element 1416a can cause the CPU 130 to execute or continue executing the interface setup module 118 to direct or otherwise cause the display device 140 to present a UI 1500 as is illustrated in FIG. 15. The UI 1500 includes a pane 1510 having selectable visual elements 1512 indicative of a listing of defined modules included in a PEI phase of the firmware 112, in an embodiment in which the firmware 112 complies with the UEFI Specification. In one aspect, as disclosed herein, the listing of defined modules includes user-selected modules that pertain to the PEI phase. A second selectable element 1505 can permit, in some instances, perusing the listing of defined modules by scrolling upward and scrolling downward to update the visible elements associated with the listing of defined modules. Other UIs similar to UI 1500 can be presented or otherwise made available for other defined modules pertaining to other portions of the firmware 112. The selectable visual elements 1512 include respective editable sections 1514. Each one of the editable sections 1514 conveys a current setting of a bitmask pertaining to a module in the listing of modules.

Selection of a first selectable visual element 1516 of the selectable visual elements 1512 can cause the CPU 130 to execute or continue executing the interface setup module 118 to direct or otherwise cause the display device 140 to highlight an editable section 1518 of the first editable sections 1514. The editable section 1518 can be highlighted in order to update a bitmask pertaining to a module associated with the first selectable visual element 1216. As such, the editable section 1518 can be edited in order to receive input information to update an extant value of the bitmask. For instance, the example hexadecimal value "80000042" can be changed to a new value using at least the input information. The input information indicative of the new value can constitute at least a portion of Mask information that can be sent by the display device 140 to the CPU 130 (refer to FIG. 1, for example). The new value can be utilized to update the debugging message settings 124, via the debugging configuration module 116, in one embodiment, in accordance with aspects described herein. In another embodiment, the new value can be utilized to update the debugging message settings 124 via the interface setup module 118.

The UI 1500 can include a pane 1520 having a visual element indicative of a range of permissible values for a bitmask. The pane 1520 also includes visual elements informative of the types of debugging messages corresponding to respective bits in the bitmask. Refer also to FIG. 2.

Figure 16:
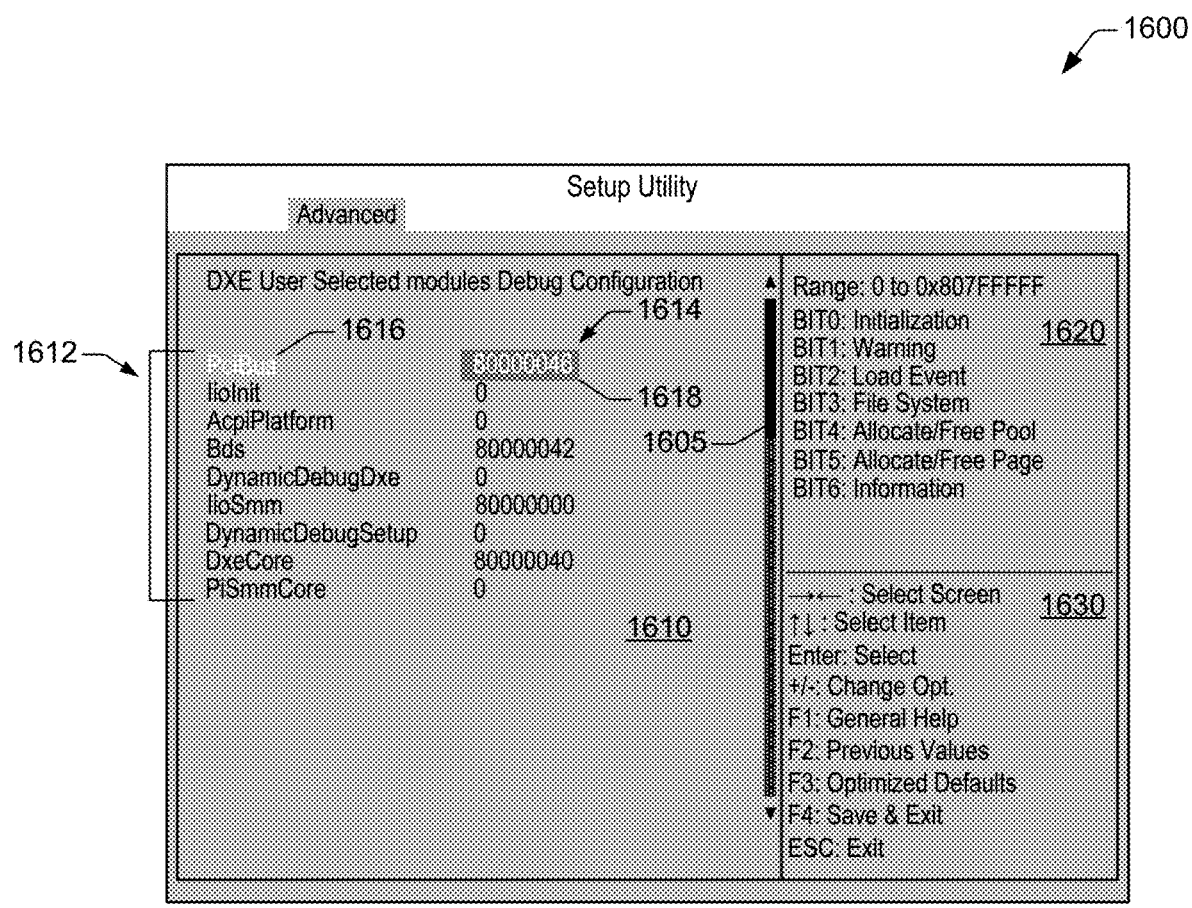

With further reference to FIG. 14, selection of the second selectable visual element 1416b can cause the CPU 130 to execute or continue executing the interface setup module 118 to cause the display device 140 to present the UI 1600 illustrated in FIG. 16. The UI 1600 includes selectable visual elements 1612 indicative of a listing of modules included in a DXE phase of the firmware 112, in the embodiment in which the firmware 112 complies with the UEFI Specification. In one aspect, the listing of modules includes user-selected modules that pertain to the DXE phase. A second selectable element 1605 can permit perusing the listing of elements by scrolling upward and scrolling downward to update the visible elements of the listing of modules. Other UIs similar to UI 1600 can be presented or otherwise made available for other portions of the firmware 112.

The selectable visual elements 1612 include respective editable sections 1614. Each one of the editable sections 1614 conveys a current setting of a bitmask pertaining to a module in the listing of modules. To this end, execution of the interface setup module 118 can cause the CPU 130 to access the debugging message settings 124 and identify one or more current bitmasks for respective modules. Thus, in one embodiment, the CPU 130 can implement a function call that supplies the current bitmask(s). The function call can be included in a library provided by the interface setup module 118. Using at least the current bitmask(s), execution of the interface setup module 118 can cause the CPU 130 to direct the display device 140 to present the applicable content (e.g., a defined hexadecimal value) in each one of the editable sections 1614.

Selection of a first selectable visual element 1616 of the selectable visual elements 1612 can cause the CPU 130 to execute or continue executing the interface setup module 118 to direct or otherwise cause the display device 140 to highlight a first editable section 1618 of the selectable sections 1614. The editable section 1618 can be highlighted in order to update a bitmask pertaining to a module associated with the first selectable visual element 1616. As such, the first editable section 1618 can be edited in order to receive input information to update an extant value of the bitmask. For instance, the example hexadecimal value "80000046" can be changed to a new value. The input information indicative of the new value can constitute at least a portion of Mask information that can be sent by the display device 140 to the CPU 130 (refer to FIG. 1, for example). The new value can be utilized to update the debugging message settings 124, via the debugging configuration module 116, in one embodiment, in accordance with aspects described herein. In another embodiment, the new value can be utilized to update the debugging message settings 124 via the interface setup module 118.

The UI 1600 also includes a pane 1620 having a visual element indicative of a range of permissible values for a bitmask. The pane 1620 also includes visual elements informative of the types of debugging messages corresponding to respective bits in the bitmask. Refer also to FIG. 2.

The UIs illustrated in FIGS. 3-16 are simply illustrative. As such, references to PEI-phase level and DXE-phase level are made simply as an example of the scope of debugging message recordation that can available during execution of a firmware, in accordance with this disclosure. The disclosure is not limited to such levels of recordation. For example, the scope of debugging message recordation can correspond to a HOB-producer-phase level and/or a HOB-consumer-phase level. As another example, SEC-phase level and/or BDS phase level also can be contemplated as scope of debugging message recordation.

Alternative or additional one or more UIs can be configured in order to permit or otherwise facilitate the configuration of availability of one or more types of debugging messages during the execution of the firmware 112 in a debugging mode of operation. An additional or alternative UI can have alternative arrangements of the visual elements described herein or can include other visual elements that can cause the computing architecture 100 illustrated in FIG. 1 to function in accordance with aspects of this disclosure.

With further reference to FIG. 1, The CPU 130 can execute (or, in some instances, can continue executing) the firmware 112 in the debugging mode of operation upon or after configuring an availability of a group of types of respective debugging messages during the execution of a group of the firmware components 114 in the debugging mode of operation. During the execution of the firmware 112 in the debugging mode of operation, the CPU 130 can provide one or more debugging messages based at least partially on at least one data structure (e.g., at least one bitmask) indicative or otherwise representative of a selection of the group of types of respective debugging messages. A first debugging message of the one or more debugging messages has a first type of the group of types.

To that end, in some embodiments, the CPU 130 can access a defined data structure (e.g., a first bitmask) from the debugging message settings 124 in response to execution of a firmware component of the firmware components 114 in the debugging mode of operation. The CPU 130 can execute a message output module 120 in order to access the defined data structure. To that end, one or more API interfaces provided by the debugging configuration module 116 can be utilized or otherwise leveraged. Specifically, execution of the message output module 120 can implement a function call to an API of the API(s). As an illustration, in embodiments in which the firmware 112 complies with the UEFI Specification, the Get API of the PPI service can be utilized in order to access, at a runtime of the firmware 112, a bitmask during a PEI phase of the firmware 112. The execution of the message output module 120 can implement a function call to the Get API in order to access a bitmask associated with a module.

In addition, or in another example, the Get API of the Protocol service can be utilized in order to access, at a runtime of the firmware 112, a bitmask during a DXE phase of the firmware 112. In this example, the CPU 130 can execute the message output module 120 to implement a library constructor to check for Protocol service availability. If the Protocol service is not available, a callback notification can be registered for the Protocol service. If Protocol service is available or in notification callback, the execution of the message output module 120 can implement a function call to the Get API. Further, the library destructor can unregister the notification callback if registered in constructor.

As disclosed herein, the defined data structure is associated with the firmware component via, for example, a mapping as described herein. In addition, the defined data structure is indicative or otherwise representative of one or more types of respective debugging messages selected to be available during the execution of the firmware component in the debugging mode of operation.

Further, the CPU 130 can execute (or, in some instances, continue executing) the message output module 120 to identify the one or more types of debugging messages using at least the defined data structure. The CPU 130 also can execute (or, in some instances, continue executing) the message output module 120 to send a group of debugging messages to a debugging output device 160. The group of debugging messages corresponds to the one or more types and can be sent to the debugging output device 160 via a coupling architecture 155.

The coupling architecture 155 can be specific to the architecture of a host computing device that includes the CPU 130 and the non-volatile memory device 110. In some embodiments, the coupling architecture 155 can include, for example, a PCI local bus, a PCIe bus, a PCI-X bus, and/or a USB. In addition, or in other embodiments, the coupling architecture 155 can include other network elements, such as wireless elements and/or non-wireless elements, such as gateway devices, switch devices, network adapters, access point devices, wireline links, wireless links, a combination thereof, or the like. The debugging output device 160 can be embodied in or can include, for example, a display device, a storage device, a virtual drive, a serial port (e.g., a COM port), or the like.

Besides a computing device that includes the CPU 130 and the non-volatile memory device 110, other devices and/or non-transitory storage media can implement the configuration of availability of debugging messages during the execution of the firmware 112 in a debugging mode of operation as is disclosed herein. More particularly, as is illustrated in the example computer architecture 1700 depicted in FIG. 17, a configuration device 1710 functionally coupled to the computing device can configure the availability of such debugging messages.

For that purpose, amongst other purposes, the configuration device 1710 can include components—e.g., hardware component(s), software component(s), or a combination thereof—that can permit or otherwise facilitate operating in accordance with this disclosure. The configuration device 1710 also can be coupled to other components that also can permit or otherwise facilitate operating in accordance with this disclosure. Specifically, the configuration device 1710 is functionally coupled to at least the CPU 130 and includes one or more memory devices 1712 (collectively referred to as a memory 1712).

The configuration device 1710 constitutes a side-band structure and can be functionally coupled to the CPU 130 via coupling architecture 1705. Similar to other coupling architectures disclosed herein, the coupling architecture 1705 can be specific to the architecture of the configuration device 1710. In some embodiments, the coupling architecture 1705 can include, for example, a PCIe bus and/or a USB. In addition, or in other embodiments, the coupling architecture 1705 can include other network elements, such as wireless elements and/or non-wireless elements, such as gateway devices, switch devices, network adapters, access point devices, wireline links, wireless links, a combination thereof, or the like.

The memory 1712 can be embodied in or can include a main memory device and/or one or more mass storage devices. As is illustrated in FIG. 17, the memory 1712 can retain the interface setup module 118 and the debugging message settings 124.

Figure 17:
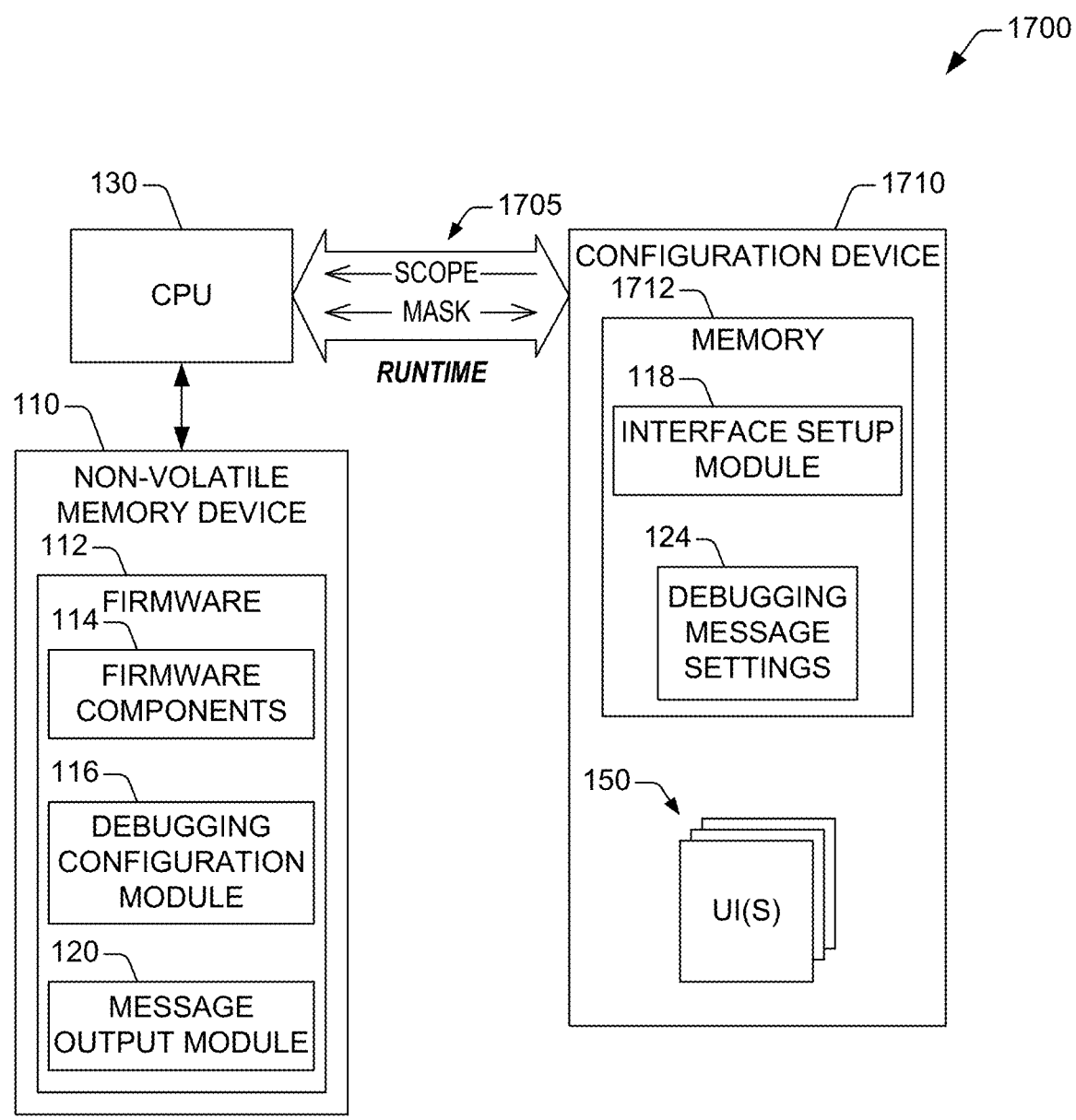
FIG. 17 illustrates an example of a computer architecture in accordance with one or more embodiments of the disclosure.

While not depicted in FIG. 17, the configuration device 1710 also can include at least one processor, e.g., a CPU having one or multiple processors, each having one or more processing cores. The at least one processor can be functionally coupled to the memory 112. Thus, the configuration device 1710—more particularly, the at least one processor—can execute the interface setup module 118 in order to select, in accordance with aspects described herein, a group of types of debugging messages to be available during the execution of the firmware 112 in the debugging mode of operation. In particular, in some aspects, the configuration device 1710 can execute the interface setup module 118 in order to provide some or all of the group of UIs 150. The provided UIs can permit or otherwise facilitate receiving information for configuration of the availability of various types of debugging messages during the runtime of the firmware 112 in a debugging mode of operation, in accordance with aspects of this disclosure.

In some embodiments, the configuration device 1710 can present at least one UI of the group of UIs 150 in response to execution of the interface setup module 118. For that purpose, the configuration device 1710 can include a display device (not depicted in FIG. 17) that can present one or more first UIs of the group of UIs 150. The first UIs can prompt the input of first information that defines a level of recordation of debugging messages during the execution of the firmware 112 in the debugging mode of operation. For instance, the first information can include Scope information as is disclosed herein.

In addition, or in other aspects, the display device can present one or more second UIs of the group of UIs 150. The second UIs can prompt the input of second information that defines one or more bitmasks associated with modules the firmware 112. For instance, the second information can include Mask information as is disclosed herein. As mentioned, this disclosure is not limited to bitmasks nor is it limited to modules. Other types of data structures instead of bitmasks can be defined for same or similar purposes. In addition, instead of modules, bitmasks can be associated with other components of the firmware 112.

In addition, or in some embodiments, the configuration device 1710 can cause a remote display device (not depicted in FIG. 17) to present the first UI(s) and the second UI(s). The configuration device 1710 and the remote display device can be functionally coupled via a network (e.g., a wireless network, a wireline network, or a combination thereof). In such a scenario, the configuration device 1710 can execute a server (such as a webserver; not shown in FIG. 17) to cause the remote display device to present the first UI(s) and the second UI(s). Execution of the server also can permit or otherwise facilitate receiving the first input information that defines a level of recordation of debugging messages during the execution of the firmware 112 in the debugging mode of operation. Execution of such a server also can permit or otherwise facilitate receiving the second input information that defines one or more bitmasks associated with modules the firmware 112.

The received first information and/or the second information can be sent by the configuration device 1710—or, specifically, at least one processor therein can cause the configuration device 1710 to send such information—to the debugging configuration module 116 in order to configure a group of types of debugging messages to be available during the execution of the firmware 112 in a debugging mode of operation, in accordance with aspects of this disclosure. Upon or after the configuration of the group of debugging messages to be available during the execution of the firmware 112, the CPU 130 can execute the debugging configuration module 116 to update the debugging message settings 124 retained in the memory 1712.

The configuration device 1710 and the non-volatile memory device 110 can exchange information related to the configuration of availability of types of respective debugging messages by means of, at least in part, a hypermedia representational state transfer (REST) interface implemented as a REDFISH-compatible interface. REDFISH is a successor to previous manageability interfaces created by the Distributed Management Task Force (DMTF). REDFISH is an open industry standard specification and schema for simple, modern, and secure management of scalable platform hardware, such as server computers located in data centers, cloud computing environments, or the like. The REDFISH specification and schema specifies hypermedia REST interfaces and utilizes JavaScript object notation (JSON) and open data protocol (OData) to integrate management solutions within existing toolchains, for example.

Thus, in one aspect, first messages that include respective Mask information can be expressed using a JSON format based on OData. In addition, or in another aspect, second messages that include respective Scope information can be expressed using a JSON format based on OData.

In one embodiment, the configuration device 1710 can be embodied in or can include a baseboard management controller (BMC). The BMC can be embodied in or can include a specialized service processor (e.g., a microcontroller) that can utilize or otherwise leverage sensors to monitor the physical state of a computer; a network server; or other types of hardware devices. The BMC also can communicate with a system administrator device by means of an OOB network connection (not depicted in FIG. 17).

More specifically, the BMC can monitor health-related aspects associated with a host computing device that includes the CPU 130 and the non-volatile memory device 110. For instance, the BMC can monitor the temperature of one or more components of the host computing device; speed of rotational components (e.g., spindle motor, CPU fan, etc.) within the host computing device; the voltage across or applied to one or more components within the host computing device; the available and/or used capacity of memory devices within the host computing device; a combination of the foregoing or the like. To accomplish such monitoring functions, in some embodiments, the BMC can be communicatively coupled to one or more components of the host computing device via, for example, at least a portion of the coupling architecture 1705.

Figure 18:
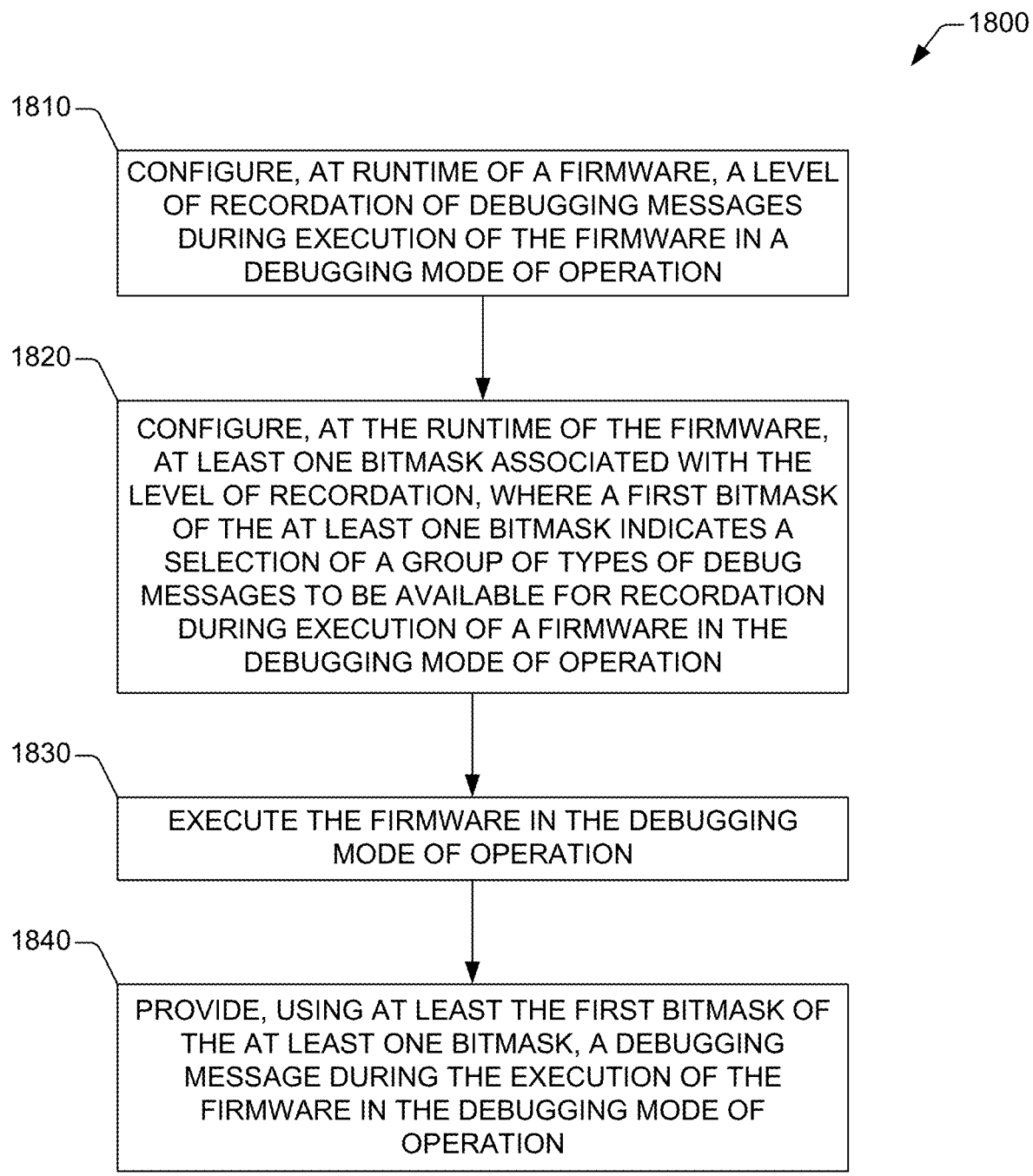
FIG. 18 illustrates an example of a mehtod in accordance with one or more embodiments of the disclosure.

FIG. 18 illustrates an example computer-implemented method 1800 for configuring the availability of one or more types of debugging messages during the execution of a firmware in a debugging mode of operation, according to one or more embodiments of the disclosure. The firmware can be embodied in or can include a UEFI-compliant firmware. The example method 1800 is not limited in that respect, however, and can be implemented for other types of firmware. The example method 1800 can be performed in response to or during a boot-up process of a computing system that includes the computing device, in a debugging mode of operation.

A computing device—or, more particularly, at least one processor therein—in accordance with this disclosure can perform the example method 1800. The computing device can include, for example, the CPU 130 and the non-volatile memory 110 included in the computing architecture 100 illustrated in FIG. 1. The at least one processor can embody or otherwise constitute the CPU 130. As another example, the computing device can be embodied in or can include the configuration device 1710. Similar to other embodiments described herein, the at least one processor can form part of one or more computing chipsets. Each one of the at least one processor can include one or more processing cores.

As such, the computing device can include machine-accessible instructions that, in response to execution by the computing device—or, more particularly, the at least one processor can cause the computing device to perform the example method 1800. For instance, the machine-accessible instructions can embody or can constitute at least a portion of a firmware in accordance with aspects of this disclosure. For instance, the machine-accessible instructions can include the debug configuration module 116 included in the firmware 112. Such machine-accessible instructions can be encoded on a non-transitory computer-readable storage medium, such as one or more memory devices (e.g., the non-volatile memory device 110 and/or other similar storage devices).

At block 1810, the computing device can configure, at a runtime of a firmware, a level of recordation of debugging messages during execution of the firmware in a debugging mode of operation. In one example, the firmware can be embodied in or can include the firmware 112 illustrated in FIG. 1 as described herein.

Configuring the level of recordation can include, in some embodiments, selecting a group of modules of the firmware that can yield at least one debugging message in response to execution in the debugging mode of operation. The group of modules can span a defined portion of the firmware. Thus, selecting the group of modules can include, for example, selecting an individual module of the firmware. Examples of the individual module of the firmware include a PCI bus module, an IPMI module, an NVMe module, a USB module, and those modules depicted in elements 1512 in FIG. 15 and elements 1612 in FIG. 16. As another example, selecting the group of modules can include selecting an entirety of modules included in a boot-up phase of the firmware. As disclosed herein, the firmware can comply with the UEFI Specification. As such, selecting the entirety of the modules included in the boot-up phase of the firmware can include selecting one of a module of a SEC phase, a module of a PEI phase, a module of a DXE phase, or a module of a BDS phase. As yet another example, selecting the group of modules can include selecting an entirety of modules of the firmware.

At block 1820, the computing device can configure, at the runtime of the firmware, at least one bitmask associated with the level of recordation. In one aspect, a first bitmask of the at least one bitmask can be indicative or otherwise representative of a selection of one or more types of debugging messages to be available during the execution of the firmware in the debugging mode of operation. In some embodiments, configuring the at least one bitmask can include configuring at least one respective string of bits (see, e.g., FIG. 2). Each bit in a string of bits indicates or otherwise represents one of a recordation enabled state or a recordation disabled state of a defined type debugging message. As mentioned, this disclosure is not limited to bitmasks and other types of data structures can be configured in some embodiments of the example method 1800.

In addition, or in other embodiments, configuring the at least one bitmask can include updating a database to include an association between at least one module or another type of component of the firmware and a defined bitmask of the at least one bitmask. In some embodiments, as disclosed herein, updating the database in such a manner can include executing a method of a first interface (e.g., a first API) of a debugging configuration service.

At block 1830, the computing device can execute the firmware in the debugging mode of operation. The execution of the firmware can include, for example, executing multiple firmware modules and/or other types of firmware components of the firmware. As is disclosed herein, note that the firmware can be executed in the debugging mode of operation without requiring that the firmware be rebuilt after the configuration block 1810 and the configuration block 1820 are implemented.

At block 1840, the computing device can provide, based at least partially on the at least one bitmask, a debugging message during the execution of the firmware in the debugging mode of operation. In one aspect, the debugging message has a first type of the one or more types selected at block 1820. In some embodiments, providing the debugging message in such a fashion can include accessing the defined bitmask from the database updated as part of block 1820. The defined bitmask can be accessed in response to execution, in the debugging mode of operation, of at least one firmware module associated with the defined bitmask.

Accessing the defined bitmask can include, in one embodiment, executing a method of a second interface (e.g., a second API) of the debugging configuration service as is disclosed herein.

In addition, providing the debugging message can include sending the debugging message to a debugging output device (e.g., debugging output device 160) in response to execution of the at least one module in the debugging mode of operation, the debugging message based at least on the defined bitmask.

While not illustrated in FIG. 18, in some embodiments, the computing device can present (e.g., display or otherwise render) at least one first user interface including first selectable visual elements for selection of the level of recordation of debugging messages during the execution of the firmware in the debugging mode of operation. In addition, or in other embodiments, the computing device can present (e.g., display or otherwise render) at least one second user interface including second selectable visual elements for the selection of the one or more types of respective one or more debugging messages.

Figure 19:
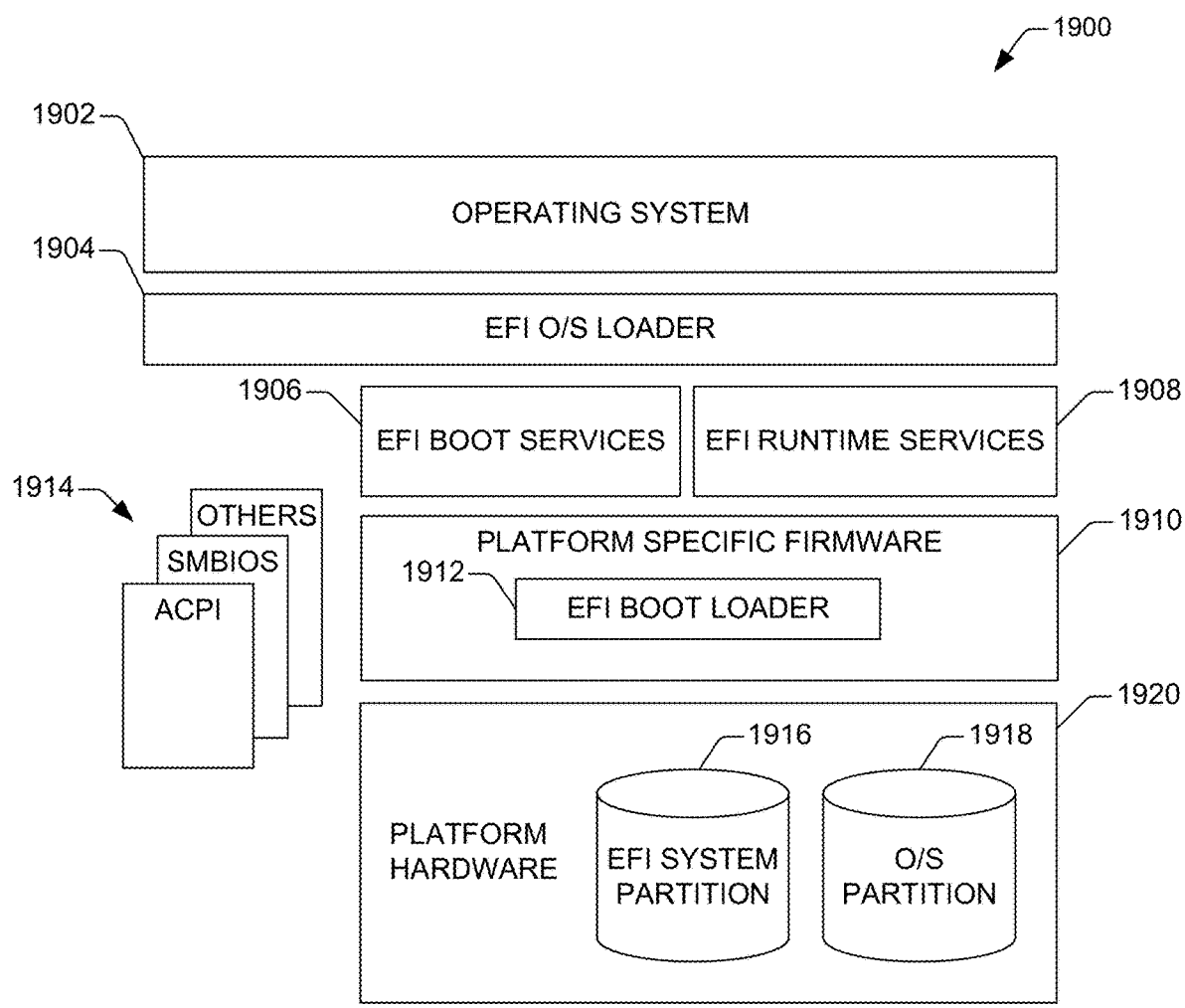
FIG. 19 illustrates an example of a software architecture for a UEFI-compliant firmware that provides an operating environment for aspects of the technologies presented herein in one or more embodiments.

FIG. 19 illustrates an example of a software architecture 1900 that includes a UEFI Specification-compliant firmware that can be configured to provide and/or utilize aspects of the technologies disclosed herein. In particular, the firmware architecture shown in FIG. 19 can be utilized to implement the firmware 112 described above. The firmware 112 can also be implemented in other ways in other configurations.

As described herein, the UEFI Specification describes an interface between an operating system 1902 and a UEFI Specification-compliant firmware 1900. The UEFI Specification also defines an interface that the firmware 1900 can implement, and an interface that the operating system 1902 (which might be referred to herein as an OS) can use while booting. How a firmware implements the interface can be left up to the manufacturer of the firmware. The UEFI Specification also defines a way for the operating system 1902 and the firmware 1900 to exchange information necessary to support the operating system boot process. The terminology "UEFI Specification" used herein refers to both the EFI Specification developed by INTEL CORPORATION and the UEFI Specification managed by the UEFI FORUM.

As is illustrated in FIG. 19, the architecture can include platform hardware 1920, such as that described below with regard to FIG. 20, and the operating system 1902. A boot loader 1912 for the operating system 1902 can be retrieved from the UEFI system partition 1916 using a UEFI operating system loader 1904. The UEFI system partition 1916 can be an architecturally shareable system partition. As such, the UEFI system partition 1916 can define a partition and file system designed to support safe sharing of mass storage between multiple vendors. An OS partition 1918 can also be utilized.

Upon or after started, the UEFI OS loader 1904 can continue to boot the complete operating system 1902. In doing so, the UEFI OS loader 1904 can use UEFI boot services 1906, an interface to other supported specifications to survey, comprehend, and initialize the various platform components and the operating system software that manages them. Thus, interfaces 1914 from other specifications can also be present on the system. For example, the ACPI and the System Management BIOS (SMBIOS) specifications can be supported.

UEFI boot services 1906 can provide interfaces for devices and system functionality used during boot time. UEFI runtime services 1908 can also be available to the UEFI OS loader 1904 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 1902 and firmware 1900, the Framework is a group of specifications that together describe a firmware implementation that has been designed to perform the full range of operations that are required to initialize a platform from power on through transfer of control to the operating system 1902. The specifications that make up the Framework, which are also available from INTEL CORPORATION, are also expressly incorporated herein by reference.

Figure 20:
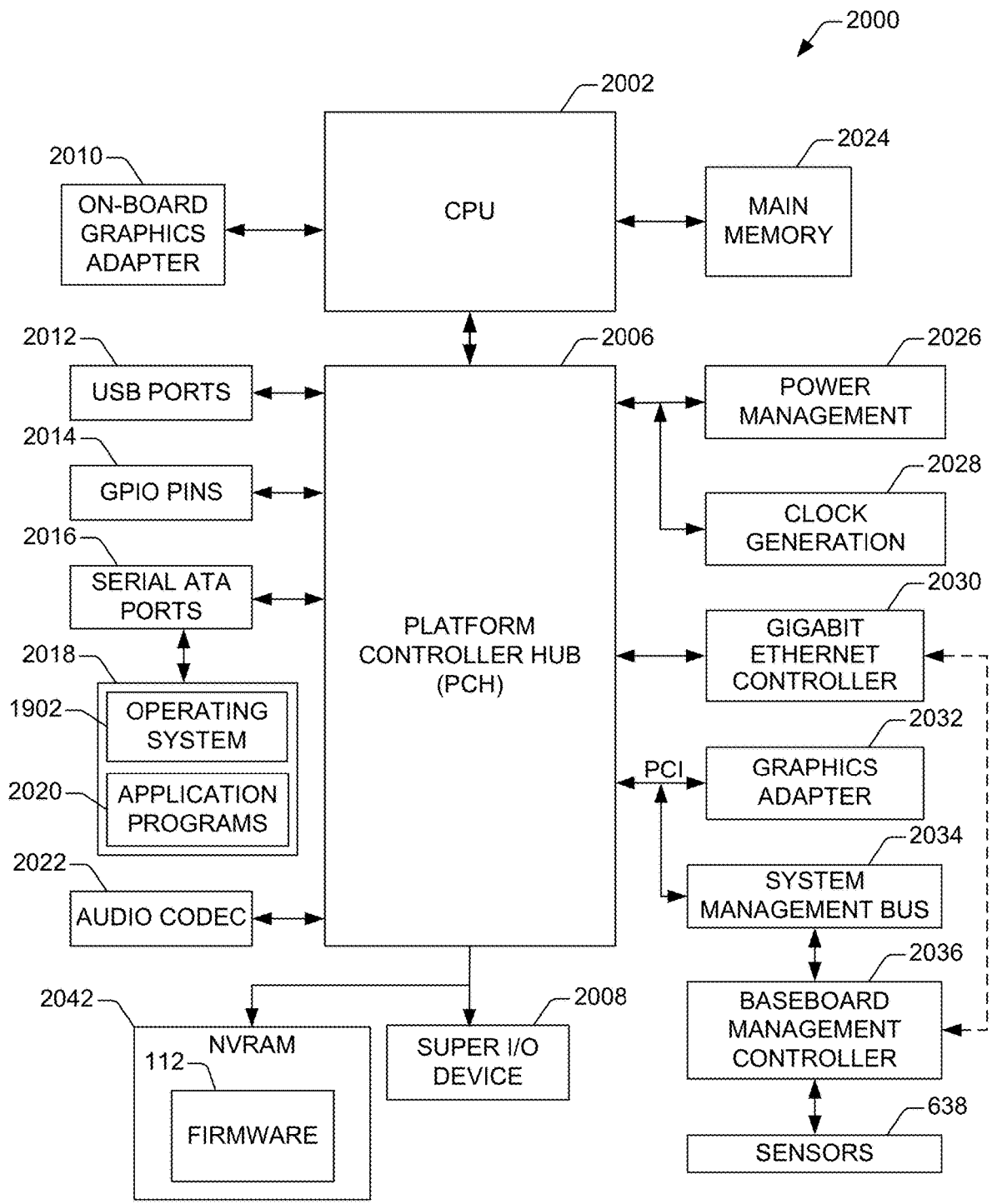
FIG. 20 illustrates an example of a computer architecture for a computer that can implement the technologies disclosed herein, in accordance with one or more embodiments.

FIG. 20 illustrates an example of a computer architecture that can provide an operating environment for the technologies presented herein. For example, the computer architecture can be utilized to implement the computing architecture 100 and/or any of the other computing systems disclosed herein.

FIG. 20 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, it is noted that the embodiments described herein can be practiced with other computer system configurations, including hand-held devices, wearable devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 20 illustrates an example of a computer architecture for a computer 2000 that can be utilized in the implementations described herein. The illustrative computer architecture shown in FIG. 20 includes a baseboard, or "motherboard", which is a printed circuit board to which a multitude of components or devices can be connected by way of a system bus or other electrical communication path. In one configuration, a CPU 2002 operates in conjunction with a Platform Controller Hub (PCH) 2006. The CPU 2002 is a central processor that performs arithmetic and logical operations necessary for the operation of the computer 2000. The computer 2000 can include a multitude of CPUs 2002. Each CPU 2002 can include, for example, multiple processing cores.

The CPU 2002 provides an interface to one or more RAM devices used as the main memory 2024 in the computer 2000 and, possibly, to an on-board graphics adapter 2010. The PCH 2006 provides an interface between the CPU 2002 and the remainder of the computer 2000.

The PCH 2006 can also be responsible for controlling many of the input/output functions of the computer 2000. In particular, the PCH 2006 can provide one or more USB ports 2012, an audio codec 2022, a Gigabit Ethernet Controller 2032, and one or more general purpose input/output (GPIO) pins 2014. The USB ports 2012 can include USB 2.0 ports, USB 3.0 ports and USB 3.1 ports among other USB ports. The audio codec 2022 can include Intel High Definition Audio, Audio Codec '97 (AC'97) and Dolby TrueHD among others.

The PCH 2006 can also include functionality for providing networking functionality through a Gigabit Ethernet Controller 2030. The Gigabit Ethernet Controller 2030 is capable of connecting the computer 2000 to another computer via a network. Connections which can be made by the Gigabit Ethernet Controller 2030 can include LAN or WAN connections. LAN and WAN networking environments are commonplace in offices, enterprise-wide computer networks, intranets, and the Internet.

The PCH 2006 can also provide a bus for interfacing peripheral card devices, such as the on-board graphics adapter 2010. In one configuration, the bus includes a PCI bus. The PCI bus can include a Peripheral Component Interconnect local bus, a Peripheral Component Interconnect extended bus and a Peripheral Component Interconnect Express bus among others.

The PCH 2006 can also provide a system management bus 2034 for use in managing the various components of the computer 2000. Additional details regarding the operation of the system management bus 2034 and its connected components are provided below. Power management circuitry 2026 and clock generation circuitry 2028 can also be utilized during the operation of the PCH 2006.

The PCH 2006 is also configured to provide one or more interfaces for connecting mass storage devices to the computer 2000. For instance, according to one configuration, the PCH 2006 includes a serial advanced technology attachment (SATA) adapter for providing one or more serial ATA ports 2016. The serial ATA ports 2016 can be connected to one or more mass storage devices storing an OS, such as OS 1902 and application programs 2020, such as a SATA disk drive 2018. As known to those skilled in the art, an OS 1902 includes a group of programs that control operations of a computer and allocation of resources. An application program is software that runs on top of the operating system 1902, or other runtime environment, and uses computer resources to perform application specific tasks desired by the user.

According to one configuration, the OS 1902 includes the LINUX operating system. According to another configuration, the OS 1902 includes the WINDOWS operating system from MICROSOFT CORPORATION. According to another configuration, the OS 1902 includes the UNIX operating system or one of its variants. It is noted that other operating systems can also be utilized.

The mass storage devices connected to the PCH 2006, and their associated computer-readable storage media, provide non-volatile storage for the computer 2000. Although the description of computer-readable storage media contained herein refers to a mass storage device, such as a hard disk or CD-ROM drive, it is noted that computer-readable storage media can be any available media that can be accessed by the computer 2000.

As an illustration, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 2000.

Communication media can embody information in a data signal, such as a modulated data signal (e.g., a carrier wave or another transport mechanism) and includes information delivery media or transport media. In some embodiments, the information can include machine-accessible instructions (e.g., computer-readable instructions and/or computer-executable instructions), data structures, program modules, or other structured or unstructured data. The terminology "modulated data signal" as utilized herein refers to a signal that has one or more of its characteristics set or changed in such a manner as to encode information in the signal. Communication media include wired media and wireless media. For example, wired media can include a wired network and/or direct-wired connection including solid-state media for the transport of signals. As another example, wireless media can include numerous media for the wireless transport of electromagnetic radiation, such as acoustic waves, RF waves, infrared waves, microwave waves, and other forms of electromagnetic waves.

A low pin count (LPC) interface can also be provided by the PCH 2006 for connecting a Super I/O device 2008. The Super I/O device 2008 is responsible for providing a number of input/output ports, including a keyboard port, a mouse port, a serial interface, a parallel port, and other types of input/output ports. The LPC interface can also connect a computer storage media such as a ROM device or a flash memory device, such as a NVRAM 2042, for storing firmware 112 that includes program code containing the basic routines that help to start up the computer 2000 and to transfer information between elements within the computer 2000 as discussed above with regard to FIG. 19.

The program modules disclosed herein, including the firmware 112, can include software instructions that, when loaded into the CPU 2002 and executed, transform a general-purpose computer into a special-purpose computer customized to permit or otherwise facilitate all, or part of, the operations disclosed herein. As detailed throughout this disclosure, the program modules can provide various tools or techniques by which the computer 2000 can participate within the overall systems or operating environments using the components, logic flows, and/or data structures discussed herein.

The CPU 2002 can be constructed from any number of transistors or other circuit elements, which can individually or collectively assume any number of states. More specifically, the CPU 2002 can operate as a state machine or finite-state machine. Such a machine can be transformed to a second machine, or a specific machine, by loading executable instructions contained within the program modules. These computer-executable instructions can transform the CPU 2002 by specifying how the CPU 2002 transitions between states, thereby transforming the transistors or other circuit elements constituting the CPU 2002 from a first machine to a second machine, wherein the second machine can be specifically configured to perform the operations disclosed herein. The states of either machine can also be transformed by receiving input from one or more user input devices, network interfaces (such as the Gigabit Ethernet Controller 2030), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include the technology used to implement the storage media, whether the storage media are characterized as primary or secondary storage, and the like. For example, if the storage media are implemented as semiconductor-based memory devices, the program modules can transform the physical state of the main memory 2024 (e.g., a semiconductor solid-state memory device) and/or the NVRAM 2004. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described herein, the PCH 2006 can include a system management bus 2034. As discussed above, when utilized to implement the computing architecture 100 and/or the computing architecture 200, the system management bus 2034 can include a BMC 106. As discussed herein, the BMC 106 is a microcontroller that monitors operation of the computer 2000. In a more specific configuration, the BMC 130 monitors health-related aspects associated with the computer 2000, such as, but not limited to, the temperature of one or more components of the computer 2000, speed of rotational components (e.g., spindle motor, CPU fan, etc.) within the computer 2000, the voltage across or applied to one or more components within the computer 2000, and the available and/or used capacity of memory devices within the computer 2000. To accomplish these monitoring functions, for example, the BMC 106 can be communicatively connected to one or more components by way of the system management bus 2034 in some configurations.

In one configuration, these components include sensor devices 2038 for measuring various operating and performance-related parameters within the computer 2000. The sensor devices 2038 can include hardware and/or software-based components configured or programmed to measure or detect one or more of the various operating and performance-related parameters.

The BMC 2036 functions as the master on the system management bus 2034 in most circumstances, but the BMC 2036 can also function as either a master or a slave in other circumstances. Each of the various components communicatively connected to the BMC 2036 by way of the system management bus 2034 is addressed using a slave address. The system management bus 2034 is used by the BMC 2036 to request and/or receive various operating and performance-related parameters from one or more components, such as the firmware 122, which are also communicatively connected to the system management bus 2034.

It is noted that the functionality provided by the computer 2000 can be provided by other types of computing devices, including hand-held computers, smartphones, gaming systems, set top boxes, tablet computers, embedded computer systems, personal digital assistants, wearable devices, and other types of computing devices available in the art. It is also contemplated that the computer 2000 might not include all the components shown in FIG. 20; can include other components that are not explicitly shown in FIG. 20; or might utilize an architecture completely different than that shown in FIG. 20.

Other Example Embodiments

Numerous other embodiments emerge from the foregoing detailed description and annexed drawings. For instance, an Example 1 of those embodiments includes a computer-implemented method having configuring, at a runtime of a firmware, a level of recordation of debugging messages during execution of the firmware in a debugging mode of operation; configuring, at the runtime of the firmware, at least one bitmask associated with the level of recordation, a first bitmask of the at least one bitmask being indicative of a selection of one or more types of respective debugging messages to be available during the execution of the firmware in the debugging mode of operation; executing the firmware in the debugging mode of operation; and providing, based at least partially on the at least one bitmask, a debugging message during the execution of the firmware in the debugging mode of operation, the debugging message having a first type of the one or more types.

An Example 2 of the numerous embodiments includes the computer-implemented method of Example 1, where the configuring the at least one bitmask includes configuring at least one respective string of bits, wherein each bit in the string of bits indicates one of a recordation enabled state or a recordation disabled state of a defined debugging message.

An Example 3 of the numerous embodiments includes the computer-implemented method of the Example 1, where the configuring the at least one bitmask includes updating a database to include an association between a module of the firmware and the first bitmask of the at least one bitmask.

An Example 4 of the numerous embodiments includes the computer-implemented method of Example 3, where the updating includes executing a method of a first interface of a service.

An Example 5 of the numerous embodiments includes the computer-implemented method of Example 4, where the providing includes accessing the first bitmask from the database in response to execution of the module in the debugging mode of operation; and sending the debugging message to a debugging output device in response to execution of the module in the debugging mode of operation, the debugging message based at least on the first bitmask.

An Example 6 of the numerous embodiments includes the computer-implemented method of Example 5, where the accessing comprises executing a method of a second interface of the service.

An Example 7 of the numerous embodiments includes the computer-implemented method of Example 11, where the configuring the level of recordation comprises selecting a group of modules of the firmware that, in response to execution in the debugging mode of operation, yields at least one second debugging message.

An Example 8 of the numerous embodiments includes the computer-implemented method of Example 7, where the selecting the group of modules comprises one of selecting an individual module of the firmware; selecting an entirety of first modules included in a boot-up phase of the firmware; or selecting an entirety of second modules included in the firmware, the entirety of second modules including the entirety of first modules.

An Example 9 of the numerous embodiments includes the computer-implemented method of Example 8, where the firmware complies with the UEFI Specification, and where the selecting the entirety of the modules included in the boot-up phase of the firmware includes selecting one of a module included in a SEC phase, a module included in a PEI phase, a module included in a DXE phase, or a module included in a BDS phase.

An Example 10 of the numerous embodiments includes the computer-implemented method of Example 1, further including presenting at least one first user interface including first selectable visual elements for selection of the level of recordation of debugging messages during the execution of the firmware.

An Example 11 of the numerous embodiments includes the computer-implemented method of Example 10, further including presenting at least one second user interface including second selectable visual elements for the selection of the one or more types of respective debugging messages.

An Example 12 of the numerous embodiments includes at least one computer-readable non-transitory storage medium having instructions encoded thereon that, in response to execution, cause a computing device to perform or facilitate operations including configuring, at a runtime of a firmware, a level of recordation of debugging messages during execution of the firmware in a debugging mode of operation; configuring, at the runtime of the firmware, at least one data structure associated with the level of recordation, a first data structure of the at least one data structure being indicative of a selection of one or more types of respective debugging messages to be available during the execution of the firmware in the debugging mode of operation; executing the firmware in the debugging mode of operations; and providing, based at least partially on the at least one data structure, a debugging message during the execution of the firmware in the debugging mode of operation, the debugging message having a first type of the one or more types.

An Example 13 of the numerous embodiments includes the at least one computer-readable non-transitory storage medium of Example 12, where the configuring the at least one data structure comprises configuring at least one respective group of bits, and where each bit in the group of bits indicates one of a recordation enabled state or a recordation disabled state of a defined debugging message.

An Example 14 of the numerous embodiments includes the at least one computer-readable non-transitory storage medium of Example 12, where the configuring the at least one data structure includes updating an association between a component of the firmware and the first data structure of the at least one data structure.

An Example 15 of the numerous embodiments includes the at least one computer-readable non-transitory storage medium of Example 14, where the updating comprises implementing a first function call to a service.

An Example 16 of the numerous embodiments includes the at least one computer-readable non-transitory storage medium of Example 16, where the providing includes accessing the first data structure in response to execution of the component of the firmware in the debugging mode of operation; and sending the debugging message to a debugging output device in response to execution of the component of the firmware in the debugging mode of operation, the debugging message based at least on the first bitmask.

An Example 17 of the numerous embodiments includes the at least one computer-readable non-transitory storage medium of Example 16, where the accessing includes implementing a second function call to the service.

An Example 18 of the numerous embodiments the at least one computer-readable non-transitory storage medium of Example 12, where the configuring the level of recordation includes selecting a group of components of the firmware that, in response to execution in the debugging mode of operation, yields at least one second debugging message.

An Example 19 of the numerous embodiments includes the at least one computer-readable non-transitory storage medium of Example 18, where the selecting the group of components includes one of selecting an individual module of the firmware; selecting an entirety of first components included in a boot-up phase of the firmware; or selecting an entirety of second components included in the firmware, the entirety of second components including the entirety of first components.

An Example 20 of the numerous embodiments includes the at least one computer-readable non-transitory storage medium of Example 19, where the firmware complies with the UEFI Specification, and wherein the selecting the entirety of the components included in the boot-up phase of the firmware comprises selecting one of a component included in a HOB producer phase or a component included in a HOB consumer phase.

An Example 21 of the numerous embodiments includes a device that includes at least one processor; at least one memory device having instructions encoded thereon that, in response to execution by the at least one processor, cause the device at least to: configure, at a runtime of a firmware, a level of recordation of debugging messages during execution of the firmware in a debugging mode of operation; configure, at the runtime of the firmware, at least one data structure associated with the level of recordation, a first data structure of the at least one data structure being indicative of a selection of one or more types of respective debugging messages to be available during the execution of the firmware in the debugging mode of operation; execute the firmware in the debugging mode of operation; and provide, based at least partially on the at least one data structure, a debugging message during the execution of the firmware in the debugging mode of operation, the debugging message having a first type of the one or more types.

An Example 22 of the numerous embodiments includes the device of Example 21, where to configure, at the runtime of the firmware, the at least one data structure, the instructions are configured to cause the device to configure at least one respective group of bits, each bit in the group of bits being indicative of one of a recordation enabled state or a recordation disabled state of a defined debugging message.

An Example 23 of the numerous embodiments includes the device of Example 21, where to configure, at the runtime of the firmware, the at least one data structure, the instructions are configured to cause the device to update an association between a component of the firmware and the first data structure of the at least one data structure.

An Example 24 of the numerous embodiments includes the device of Example 23, where to cause the device to update the association, the instructions are further configured to cause the device to implement a first function call to a service.

An Example 25 of the numerous embodiments includes the device of Example 24, where to provide the debugging message during the execution of the firmware in the debugging mode of operation, the instructions are configured to cause the device to access the first data structure in response to execution of the component of the firmware in the debugging mode of operation; and send the debugging message to a debugging output device in response to execution of the component of the firmware in the debugging mode of operation, the debugging message being based at least on the first bitmask.

An Example 26 of the numerous embodiments includes the device of Example 25, where to cause the device to access the first data structure, the instructions are further configured to cause the device to implement a second function call to the service.

Based on the foregoing, technologies for providing or otherwise facilitating dynamic configuration of availability of debugging messages during the execution of a firmware and applications of such technologies have been disclosed herein. Although the subject matter presented herein has been described in language specific to computer structural features, methodological acts, and computer readable media, it is to be understood that the present disclosure is not necessarily limited to the specific elements, features, acts, or non-transitory storage media disclosed herein. Rather, the specific elements, features, acts, and non-transitory storage media are disclosed as example forms.

The subject matter disclosed herein is provided by way of illustration only and should not be construed as limiting. Various modifications and changes can be made to the subject matter described herein without following the example configurations and applications illustrated and described, and without departing from the true spirit and scope of the present disclosure.

What is claimed is:

1. A computer-implemented method, comprising:
    configuring, at a runtime of a firmware, a level of recordation of debugging messages during execution of the firmware in a debugging mode of operation;
    configuring, at the runtime of the firmware, at least one bitmask associated with the level of recordation, a first bitmask of the at least one bitmask being indicative of a selection of one or more types of respective debugging messages to be available during the execution of the firmware in the debugging mode of operation;
    executing the firmware in the debugging mode of operation; and
    providing, based at least partially on the at least one bitmask, a debugging message during the execution of the firmware in the debugging mode of operation, the debugging message having a first type of the one or more types.

2. The computer-implemented method of claim 1, wherein the configuring the at least one bitmask comprises configuring at least one respective string of bits, wherein each bit in the string of bits indicates one of a recordation enabled state or a recordation disabled state of a defined debugging message.

3. The computer-implemented method of claim 1, wherein the configuring the at least one bitmask comprises updating a database to include an association between a module of the firmware and the first bitmask of the at least one bitmask.

4. The computer-implemented method of claim 3, wherein the updating comprises executing a method of a first interface of a service.

5. The computer-implemented method of claim 4, wherein the providing comprises:
  accessing the first bitmask from the database in response to execution of the module in the debugging mode of operation; and
  sending the debugging message to a debugging output device in response to execution of the module in the debugging mode of operation, the debugging message based at least on the first bitmask.

6. The computer-implemented method of claim 5, wherein the accessing comprises executing a method of a second interface of the service.

7. The computer-implemented method of claim 1, wherein the configuring the level of recordation comprises selecting a group of modules of the firmware that, in response to execution in the debugging mode of operation, yields at least one second debugging message.

8. The computer-implemented method of claim 7, wherein the selecting the group of modules comprises one of:
  selecting an individual module of the firmware;
  selecting an entirety of first modules included in a boot-up phase of the firmware; or
  selecting an entirety of second modules included in the firmware, the entirety of second modules including the entirety of first modules.

9. The computer-implemented method of claim 8, wherein the firmware complies with the Unified Extensible Firmware Interface (UEFI) Specification, and wherein the selecting the entirety of the modules included in the boot-up phase of the firmware comprises selecting one of a module included in a security (SEC) phase, a module included in a pre-EFI initialization (PEI) phase, a module included in a driver environment execution (DXE) phase, or a module included in a boot device selection (BDS) phase.

10. The computer-implemented method of claim 1, further comprising presenting at least one first user interface including first selectable visual elements for selection of the level of recordation of debugging messages during the execution of the firmware.

11. The computer-implemented method of claim 10, further comprising presenting at least one second user interface including second selectable visual elements for the selection of the one or more types of respective debugging messages.

12. At least one computer-readable non-transitory storage medium having instructions encoded thereon that, in response to execution, cause a computing device to perform or facilitate operations comprising:
  configuring, at a runtime of a firmware, a level of recordation of debugging messages during execution of the firmware in a debugging mode of operation;
  configuring, at the runtime of the firmware, at least one data structure associated with the level of recordation, a first data structure of the at least one data structure being indicative of a selection of one or more types of respective debugging messages to be available during the execution of the firmware in the debugging mode of operation;
  executing the firmware in the debugging mode of operations; and
  providing, based at least partially on the at least one data structure, a debugging message during the execution of the firmware in the debugging mode of operation, the debugging message having a first type of the one or more types.

13. The at least one computer-readable non-transitory storage medium of claim 12, wherein the configuring the at least one data structure comprises configuring at least one respective group of bits, wherein each bit in the group of bits indicates one of a recordation enabled state or a recordation disabled state of a defined debugging message.

14. The at least one computer-readable non-transitory storage medium of claim 12, wherein the configuring the at least one data structure comprises updating an association between a component of the firmware and the first data structure of the at least one data structure.

15. The at least one computer-readable non-transitory storage medium of claim 14, wherein the updating comprises implementing a first function call to a service.

16. The at least one computer-readable non-transitory storage medium of claim 15, wherein the providing comprises accessing the first data structure in response to execution of the component of the firmware in the debugging mode of operation; and
  sending the debugging message to a debugging output device in response to execution of the component of the firmware in the debugging mode of operation, the debugging message based at least on the first bitmask.

17. The at least one computer-readable non-transitory storage medium of claim 16, wherein the accessing comprises implementing a second function call to the service.

18. The at least one computer-readable non-transitory storage medium of claim 12, wherein the configuring the level of recordation comprises selecting a group of components of the firmware that, in response to execution in the debugging mode of operation, yields at least one second debugging message.

19. The at least one computer-readable non-transitory storage medium of claim 18, wherein the selecting the group of components comprises one of:
  selecting an individual module of the firmware;
  selecting an entirety of first components included in a boot-up phase of the firmware; or
  selecting an entirety of second components included in the firmware, the entirety of second components including the entirety of first components.

20. The at least one computer-readable non-transitory storage medium of claim 19, wherein the firmware complies with the Unified Extensible Firmware Interface (UEFI) Specification, and wherein the selecting the entirety of the components included in the boot-up phase of the firmware comprises selecting one of a component included in a hand-off block (HOB) producer phase or a component included in a HOB consumer phase.

21. A device, comprising:
  at least one processor;
  at least one memory device having instructions encoded thereon that, in response to execution by the at least one processor, cause the device at least to:
    configure, at a runtime of a firmware, a level of recordation of debugging messages during execution of the firmware in a debugging mode of operation;

configure, at the runtime of the firmware, at least one data structure associated with the level of recordation, a first data structure of the at least one data structure being indicative of a selection of one or more types of respective debugging messages to be available during the execution of the firmware in the debugging mode of operation;

execute the firmware in the debugging mode of operation; and provide, based at least partially on the at least one data structure, a debugging message during the execution of the firmware in the debugging mode of operation, the debugging message having a first type of the one or more types.

22. The device of claim 21, wherein to configure, at the runtime of the firmware, the at least one data structure, the instructions are configured to cause the device to configure at least one respective group of bits, each bit in the group of bits being indicative of one of a recordation enabled state or a recordation disabled state of a defined debugging message.

23. The device of claim 21, wherein to configure, at the runtime of the firmware, the at least one data structure, the instructions are configured to cause the device to update an association between a component of the firmware and the first data structure of the at least one data structure.

24. The device of claim 23, wherein to cause the device to update the association, the instructions are further configured to cause the device to implement a first function call to a service.

25. The device of claim 24, wherein to provide the debugging message during the execution of the firmware in the debugging mode of operation, the instructions are configured to cause the device to access the first data structure in response to execution of the component of the firmware in the debugging mode of operation; and send the debugging message to a debugging output device in response to execution of the component of the firmware in the debugging mode of operation, the debugging message being based at least on the first bitmask.

26. The device of claim 25, wherein to cause the device to access the first data structure, the instructions are further configured to cause the device to implement a second function call to the service.

* * * * *